US010598059B2

(12) United States Patent
Geer et al.

(10) Patent No.: US 10,598,059 B2
(45) Date of Patent: *Mar. 24, 2020

(54) SLOTTED SNAP-ACTION VALVE ASSEMBLY FOR EXHAUST SYSTEM

(71) Applicant: Tenneco Automotive Operating Company Inc., Lake Forest, IL (US)

(72) Inventors: Larry J. Geer, Jackson, MI (US); Erwin Peters, Cement City, MI (US); Stephen M. Thomas, Laingsburg, MI (US); William E. Hill, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 559 days.

This patent is subject to a terminal disclaimer.

(21) Appl. No.: 15/238,838

(22) Filed: Aug. 17, 2016

(65) Prior Publication Data
US 2018/0051609 A1 Feb. 22, 2018

(51) Int. Cl.
*F01N 1/16* (2006.01)
*F01N 1/02* (2006.01)
(Continued)

(52) U.S. Cl.
CPC ............ *F01N 1/165* (2013.01); *F01N 1/026* (2013.01); *F01N 13/08* (2013.01); *F02D 9/106* (2013.01);
(Continued)

(58) Field of Classification Search
CPC . F01N 1/08; F01N 1/161; F01N 1/163; F01N 1/165; F01N 3/0235; F01N 3/0236;
(Continued)

(56) References Cited

U.S. PATENT DOCUMENTS 1,517,335 A * 12/1924 Zinis ..................... F16L 29/007
126/292
2,824,755 A * 2/1958 Lamphear ............... F16L 37/23
251/149.2

(Continued)

FOREIGN PATENT DOCUMENTS

JP 2006009667 A 1/2006
JP 2016079807 A 5/2016
(Continued)

*Primary Examiner* — Kevin F Murphy
*Assistant Examiner* — Jonathan J Waddy
(74) *Attorney, Agent, or Firm* — Harness, Dickey & Pierce, P.L.C.

(57) ABSTRACT

A snap-action valve assembly for an exhaust system and a method for manufacturing the same is provided. The valve assembly includes a first conduit and a second conduit that is partially received in the first conduit. A valve flap is disposed within the first conduit for controlling exhaust flow. A shaft supports the valve flap in the first conduit for rotation between open and closed positions. The first conduit has first and second slots, each extending from an open slot end to a closed slot end. First and second bushings supporting the shaft are disposed within the slots between the second conduit and the closed slot ends. A pad made of wire mesh is attached to the valve flap. The pad includes an end portion that contacts the first conduit in the closed position to dampen vibration and reduce valve flap flutter.

16 Claims, 13 Drawing Sheets

(51) Int. Cl.
*F01N 13/08* (2010.01)
*F16K 1/20* (2006.01)
*F16K 31/00* (2006.01)
*F16K 47/04* (2006.01)
*F16K 1/22* (2006.01)
*F02D 9/10* (2006.01)

(52) U.S. Cl.
CPC ............ *F16K 1/2007* (2013.01); *F16K 1/224* (2013.01); *F16K 31/003* (2013.01); *F16K 47/04* (2013.01); *F01N 2240/36* (2013.01); *F01N 2390/00* (2013.01); *F02D 9/1065* (2013.01)

(58) Field of Classification Search
CPC .... F01N 13/08; F01N 13/087; F01N 2240/36; F01N 1/026; F01N 2390/00; F02D 9/10; F02D 9/1005; F02D 9/101; F02D 9/102; F02D 9/1025; F02D 9/1045; F02D 9/1065; F02D 9/1095; F02D 9/1015; F16K 1/2007; F16K 1/2028; F16K 1/205; F16K 1/221; F16K 1/224; F16K 1/2261; F16K 31/003; F16K 47/04
USPC ................................ 251/305, 306, 307, 308
See application file for complete search history.

(56) References Cited

U.S. PATENT DOCUMENTS

| | | | |
|---|---|---|---|
| 4,254,752 A | 3/1981 | Friddell et al. | |
| 4,541,506 A | 9/1985 | Venning et al. | |
| 4,858,738 A | 8/1989 | Novoa | |
| 5,355,673 A | 10/1994 | Sterling et al. | |
| 5,669,350 A * | 9/1997 | Altmann | F02D 9/10 123/337 |
| 5,744,762 A | 4/1998 | Seki et al. | |
| 6,003,490 A * | 12/1999 | Kihara | F02D 9/1015 123/337 |
| 6,047,950 A * | 4/2000 | Pontoppidan | F02D 9/10 123/337 |
| 6,085,781 A | 7/2000 | Boutry | |
| 6,527,006 B2 | 3/2003 | Jackson | |
| 6,736,160 B2 | 5/2004 | Nagai et al. | |
| 7,451,854 B2 | 11/2008 | Suzuki et al. | |
| 7,896,130 B2 | 3/2011 | Hill et al. | |
| 8,201,660 B2 | 6/2012 | Han et al. | |
| 8,256,454 B2 | 9/2012 | Xu et al. | |
| 8,468,813 B2 | 6/2013 | Hill et al. | |
| 8,657,065 B1 * | 2/2014 | Hill | F01N 1/168 181/254 |
| 9,121,315 B2 | 9/2015 | Abram et al. | |
| 9,464,559 B2 | 10/2016 | Middleton, Jr. et al. | |
| 9,540,995 B2 | 1/2017 | Houtschilt et al. | |
| 10,180,092 B2 * | 1/2019 | Geer | F01N 1/08 |
| 10,253,664 B2 * | 4/2019 | Middleton, Jr. | F01N 1/166 |
| 2002/0162983 A1 * | 11/2002 | Bailey | F16K 1/22 251/144 |
| 2005/0211221 A1 * | 9/2005 | Matsuda | F02D 9/10 123/337 |
| 2009/0116938 A1 | 5/2009 | Wakabayashi | |
| 2009/0126356 A1 | 5/2009 | Abram et al. | |
| 2010/0263211 A1 * | 10/2010 | Sahs | F16K 27/0218 29/890.131 |
| 2010/0263743 A1 * | 10/2010 | Lefler | F02D 9/04 137/527 |
| 2010/0313554 A1 | 12/2010 | Abram | |
| 2013/0056083 A1 | 3/2013 | Abram et al. | |
| 2013/0232961 A1 | 9/2013 | Abram | |
| 2013/0299004 A1 | 11/2013 | Abram | |
| 2014/0053923 A1 | 2/2014 | Martinelli et al. | |
| 2014/0246617 A1 * | 9/2014 | Diel | F16K 1/222 251/305 |
| 2015/0162760 A1 | 6/2015 | Clark | |
| 2017/0204756 A1 | 7/2017 | Middleton, Jr. et al. | |
| 2018/0051607 A1 * | 2/2018 | Geer | F01N 1/08 |
| 2018/0051610 A1 * | 2/2018 | Thomas | F01N 1/026 |

FOREIGN PATENT DOCUMENTS

| | | |
|---|---|---|
| WO | 2010135095 A2 | 11/2010 |
| WO | 20150027566 A1 | 3/2015 |

* cited by examiner

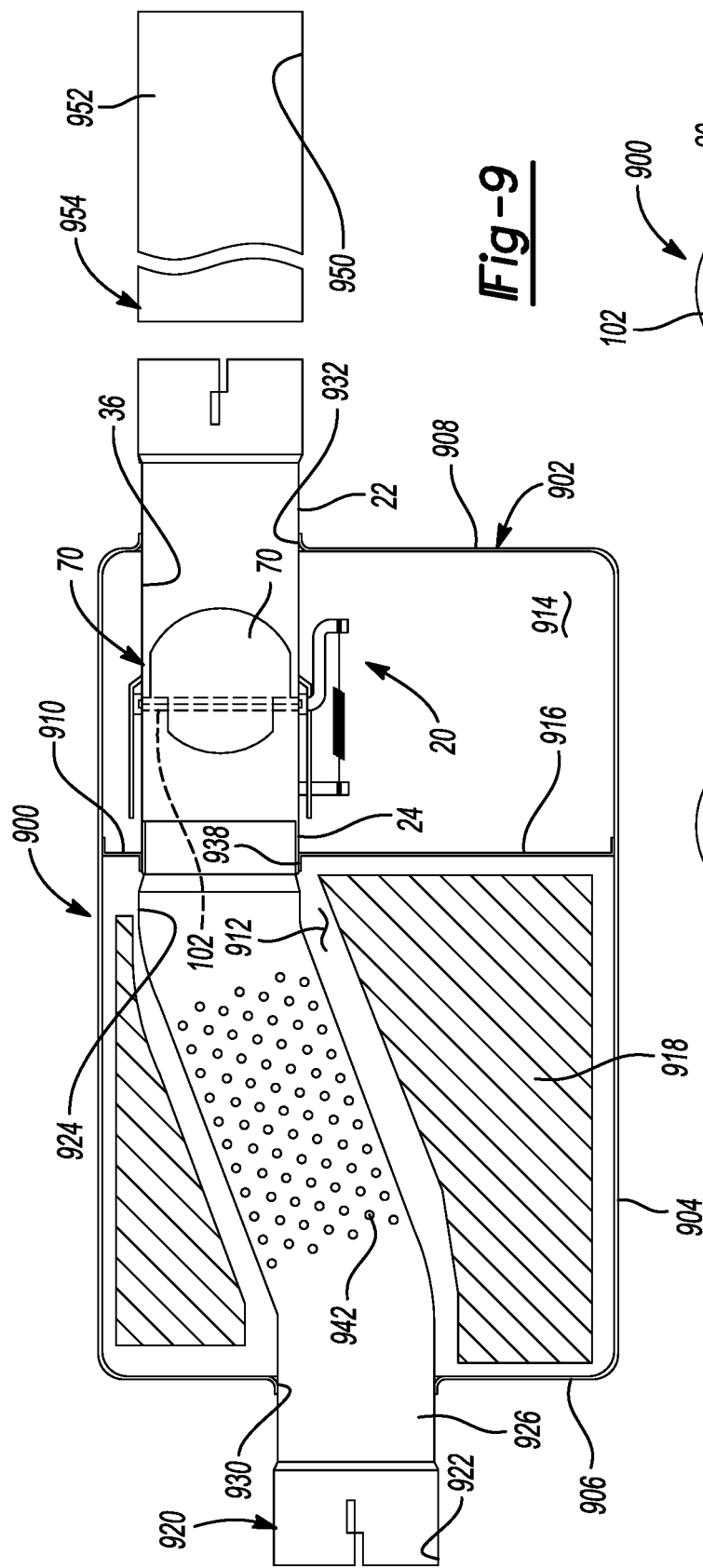
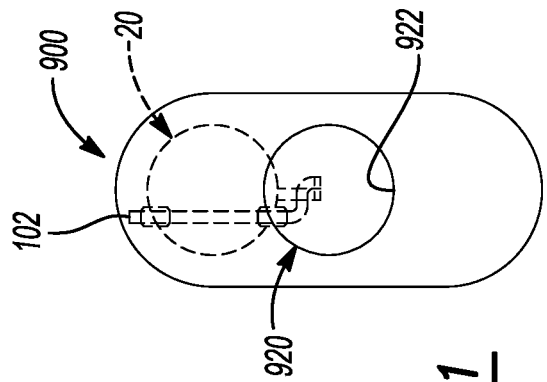
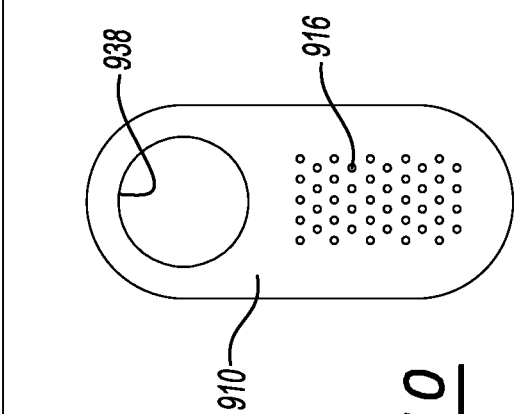
Fig-9
Fig-10
Fig-11

SLOTTED SNAP-ACTION VALVE ASSEMBLY FOR EXHAUST SYSTEM

FIELD

The subject disclosure relates to valve assemblies used in an exhaust system of a vehicle and to methods of manufacturing such valve assemblies.

BACKGROUND

This section provides background information related to the present disclosure which is not necessarily prior art.

Many vehicle exhaust systems use active and/or passive valve assemblies to alter the characteristics of exhaust flow through a conduit as the exhaust pressure increases due to increasing engine speed. Such valves can be used to reduce low frequency noise by directing exhaust through mufflers or other exhaust system components. For example, valves can direct exhaust flow past obstructions, which create vortices that absorb low frequency sound energy. Active valves carry the increased expense of requiring a specific actuating element, such as a solenoid. Passive valves utilize the pressure of the exhaust flow in the conduit to actuate the valve. Although passive valves are less expensive, traditional passive valves create unwanted back pressure when the valve is open, can be difficult to manufacture, and are susceptible to vibration related noise and excessive valve flutter caused by flowrate fluctuations in the engine's exhaust flow (i.e. exhaust pulsation). There is seen to be a need in the art for a passive valve that is relatively inexpensive to manufacture, is quieter than existing passive valves, and minimizes unwanted back pressure in the open position.

SUMMARY

This section provides a general summary of the disclosure and is not a comprehensive disclosure of its full scope or all of its features.

In accordance with one aspect of the subject disclosure, a snap-action valve assembly for an exhaust system is provided. The snap-action valve assembly includes a first conduit and a second conduit. The first conduit extends along a central axis from a junction end to a distal end. The first conduit has a first conduit wall with an outside surface and an inner mating surface. The second conduit extends co-axially with the central axis between an insertion end and a proximal end. The second conduit has a second conduit wall with an inner surface and an outer mating surface. The first and second conduits cooperate to define an exhaust passageway therein that extends from the proximal end of the second conduit to the distal end of the first conduit. A valve flap is disposed within the first conduit for controlling exhaust flow through the exhaust passageway. A shaft supports the valve flap in the first conduit for rotation about a pivot axis between a closed position and an open position. First and second bushings support the shaft on the first conduit. Each of the first and second bushings includes a shaft opening that receives the shaft. The insertion end of the second conduit is received in the junction end of the first conduit such that the outer mating surface of the second conduit bears against the inner mating surface of the first conduit. The first conduit has first and second slots. Each of the first and second slots extend through the first conduit wall from an open slot end positioned at the junction end of the first conduit to a closed slot end that is longitudinally spaced from the junction end of the first conduit. The first and second bushings are disposed within the first and second slots, respectively, between the insertion end of the second conduit and the closed slot ends of the first and second slots.

In accordance with another aspect of the subject disclosure, a pad is attached to the valve flap. The pad has a body portion that is attached to the valve flap and an end portion that extends over the first arcuate edge of the valve flap. When the valve flap is rotated to the closed position, the end portion of the pad contacts the inside surface of the first conduit. The pad has a variable thickness that increases moving from the body portion of the pad to a peak located along the end portion of the pad. Accordingly, the end portion of the pad includes an abutment surface that extends from the body portion of the pad at a first angle relative to the valve flap plane where the first angle is an acute angle. The pad helps reduce vibration related harmonics and valve flap flutter when the valve flap is at or near the closed position.

In accordance with another aspect of the subject disclosure, a method of manufacturing the snap-action valve assemblies is described above. The method comprises the steps of: providing a first conduit with a junction end, providing a second conduit with an insertion end, and cutting the first and second slots into the junction end of the first conduit. The method further comprises the steps of: placing first and second bushing sleeves over first and second bushings to form first and second bushing subassemblies, placing the first bushing subassembly on the shaft by sliding the shaft through the first bushing, attaching a valve flap to a shaft, and placing the second bushing subassembly on the shaft by sliding the shaft through the second bushing. These steps form a valve flap subassembly including the shaft, valve flap, and first and second bushing subassemblies where the valve flap is positioned on the shaft between the first and second bushing subassemblies. The method includes the step of sliding the valve flap subassembly into the first conduit from the junction end. In accordance with this step, the shaft, the first and second bushings, and the first and second bushing sleeves are slidingly received in the first and second slots and are slid towards the closed slot ends until the first and second bushing sleeves abut the closed slot ends. The method also includes the step of sliding the insertion end of the second conduit into the junction end of the first conduit until the insertion end of the second conduit abuts the first and second bushing sleeves.

Advantageously, the snap-action valve assembly disclosed herein is easier to manufacture by the method disclosed herein and can reduce the amount of welding required. In addition, the disclosed snap-action valve assemblies include improved rattle solutions and reduced back pressure in the open position.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 9 is a top cross-sectional view of an exemplary exhaust muffler that includes the exemplary snap-action valve assembly shown in FIG. 1;

FIG. 10 is a front elevation view of a partition within the exemplary exhaust muffler shown in FIG. 9;

FIG. 11 is a rear elevation view of the exemplary exhaust muffler shown in FIG. 9;

DETAILED DESCRIPTION

Figure 1:
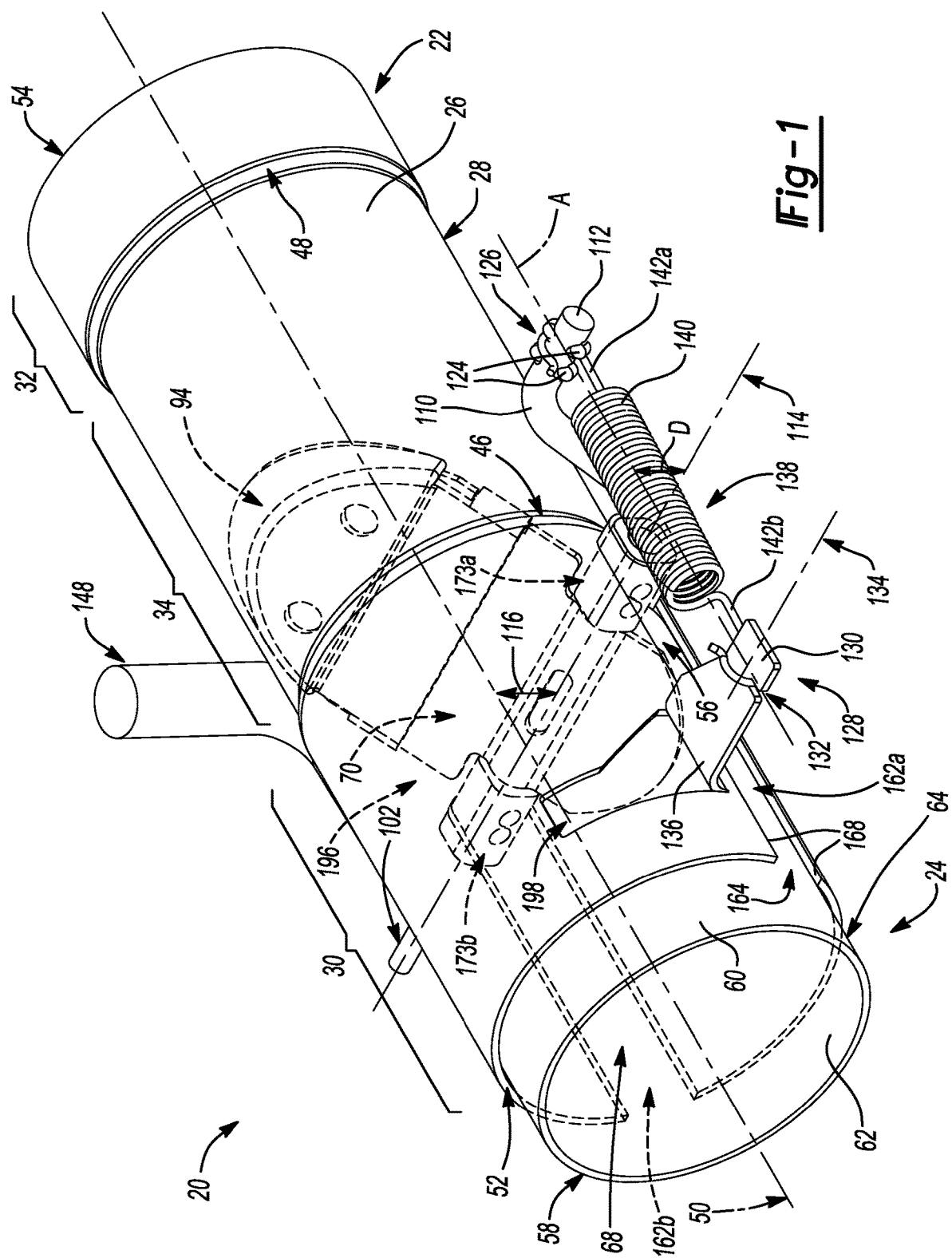
FIG. 1 is a side perspective view of an exemplary snap-action valve assembly that is constructed in accordance with the subject disclosure.

Referring to the Figures, wherein like numerals indicate corresponding parts throughout the several views, a snap-action valve assembly 20 for an exhaust system of a vehicle is disclosed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-4, the snap-action valve assembly 20 includes a first conduit 22 and a second conduit 24. It should be appreciated that the first and second conduits 22, 24 are two of many component parts in the exhaust system of the vehicle. Although the first and second conduits 22, 24 may have a variety of different shapes and sizes, in the illustrated example, the first and second conduits 22, 24 have a tubular shape and may alternatively be described as tubes or pipes. The first conduit 22 has a first conduit wall 26 presenting an outside surface 28. The first conduit wall 26 may be made from a variety of different materials. By way of non-limiting example, the first conduit wall 26 may be made from SS409 or SS439 stainless steel. In the illustrated example, the first conduit 22 is separated into a first enlarged conduit segment 30, a second enlarged conduit segment 32, and a neck portion 34 disposed longitudinally between the first enlarged conduit segment 30 and the second enlarged conduit segment 32. The neck portion 34 of the first conduit 22 has an inside surface 36 and the first and second enlarged conduit segments 30, 32 have inner mating surfaces 38a, 38b.

The neck portion 34 of the first conduit 22 has a first inner diameter 40 that may be measured across the inside surface 36 of the neck portion 34. The first enlarged conduit segment 30 of the first conduit 22 has a second inner diameter 42 that may be measured across the inner mating surface 38a of the first enlarged conduit segment 30. The second enlarged conduit segment 32 of the first conduit 22 has a third inner diameter 44 that may be measured across the inner mating surface 38b of the second enlarged conduit segment 32. The first inner diameter 40 of the neck portion 34 of the first conduit 22 is smaller than the second inner diameter 42 of the first enlarged conduit segment 30 and the third inner diameter 44 of the second enlarged conduit segment 32. In the illustrated example, the second inner diameter 42 of the first enlarged conduit segment 30 is equal to the third inner diameter 44 of the second enlarged conduit segment 32; however, other configurations are possible where the second inner diameter 42 of the first enlarged conduit segment 30 is different from the third inner diameter 44 of the second enlarged conduit segment 32.

The first conduit 22 includes a first transition 46 and a second transition 48 that are longitudinally spaced from each other. The first transition 46 is disposed longitudinally between the first enlarged conduit segment 30 and the neck portion 34 of the first conduit 22. The second transition 48 is disposed longitudinally between the second enlarged conduit segment 32 and the neck portion 34 of the first conduit 22. In other words, the first conduit 22 transitions from the first inner diameter 40 of the neck portion 34 to the second inner diameter 42 of the first enlarged conduit segment 30 at the first transition 46 and the first conduit 22 transitions from the first inner diameter 40 of the neck portion 34 to the third inner diameter 44 of the second enlarged conduit segment 32 at the second transition 48. The first and second transitions 46, 48 may be constructed to taper gradually or abruptly between the neck portion 34 and the first and second enlarged conduit segments 30, 32 of the first conduit 22.

Still referring to FIGS. 1-4, the first conduit 22 extends longitudinally along a central axis 50 from a junction end 52 at the first enlarged conduit segment 30 to a distal end 54 at the second enlarged conduit segment 32. The second conduit 24 extends longitudinally and co-axially with the central axis 50 between an insertion end 56 and a proximal end 58. The second conduit 24 has a second conduit wall 60 presenting an inner surface 62 and an outer mating surface 64.

The second conduit wall 60 may be made from a variety of different materials. By way of non-limiting example, the second conduit wall 60 may also be made from SS409 or SS439 stainless steel. The second conduit 24 has an outer diameter 66 that may be measured across the outer mating surface 64 of the second conduit 24. The outer diameter 66 of the second conduit 24 is smaller than the second inner diameter 42 of the first enlarged segment of the first conduit 22. When the snap-action valve assembly 20 is fully assembled (FIG. 1), the insertion end 56 of the second conduit 24 is slidingly received in the first enlarged conduit segment 30 of the first conduit 22 and the outer mating surface 64 of the second conduit 24 overlaps with and bears against the inner mating surface 38a of the first enlarged conduit segment 30 of the first conduit 22. As such, the second conduit 24 extends outwardly from the junction end 52 of the first conduit 22 and the first and second conduits 22, 24 cooperate to define an exhaust passageway 68 therein that extends longitudinally from the proximal end 58 of the second conduit 24 to the distal end 54 of the first conduit 22. During operation of the vehicle, exhaust from the vehicle's engine (not shown) can flow through the exhaust passageway 68 in the first and second conduits 22, 24. Although the first and second conduits 22, 24 can be attached in a variety of different ways to prevent separation, in one example the junction end 52 of the first conduit 22 is welded to the outer mating surface 64 of the second conduit 24. Moreover, it should be appreciated that the snap-action valve assembly 20 may be configured where exhaust flow enters through the first conduit 22 and exits through the second conduit 24 or vice versa.

As shown in FIGS. 1-4, a valve flap 70 is disposed within the first conduit 22. The valve flap 70 defines a valve flap plane 72 and includes a first valve flap ear 74, a second valve flap ear 76, and a curved section 78 disposed between the first valve flap ear 74 and the smaller valve flap 70 ear. The first and second valve flap ears 74, 76 extend in the valve flap plane 72. The curved section 78 defines a channel 80 therein that is spaced from and transverse to the central axis 50. The first valve flap ear 74 includes a first arcuate edge 82 and a pair of linear side edges 84. The first valve flap ear 74 extends from the curved section 78 of the valve flap 70 and terminates at the first arcuate edge 82. The second valve flap ear 76 includes a second arcuate edge 86. The second valve flap ear 76 extends from the curved section 78 of the valve flap 70 and terminates at the second arcuate edge 86. The valve flap 70 also includes a pair of bushing cut-outs 88 at the curved section 78 of the valve flap 70. The pair of bushing cut-outs 88 extend between the pair of linear side edges 84 of the first valve flap ear 74 and the second arcuate edge 86 of the second valve flap ear 76. It should be appreciated that the curved section 78 of the valve flap 70 is off-center, such that the first valve flap ear 74 has a greater surface area than the second valve flap ear 76. The valve flap 70 may be made of a variety of different materials. By way of non-limiting example, the valve flap 70 may be made from SS409 or SS439 stainless steel.

The snap-action valve assembly 20 includes a pad 94 that is carried on the valve flap 70. The pad 94 includes a body portion 96 that is attached to the first valve flap ear 74 and an end portion 98 that extends over the first arcuate edge 82 of the first valve flap ear 74. Although the pad 94 may be made of a variety of different materials and may be attached to the valve flap 70 in a number of different ways, in the illustrated example, the pad 94 is made of wire mesh and the body portion 96 of the pad 94 is attached to the first valve flap ear 74 by spot welds 100. By way of example and without limitation, the wire mesh forming the pad 94 may be made from SS316 stainless steel mesh that has a density ranging from 25-30 percent.

Figure 3:
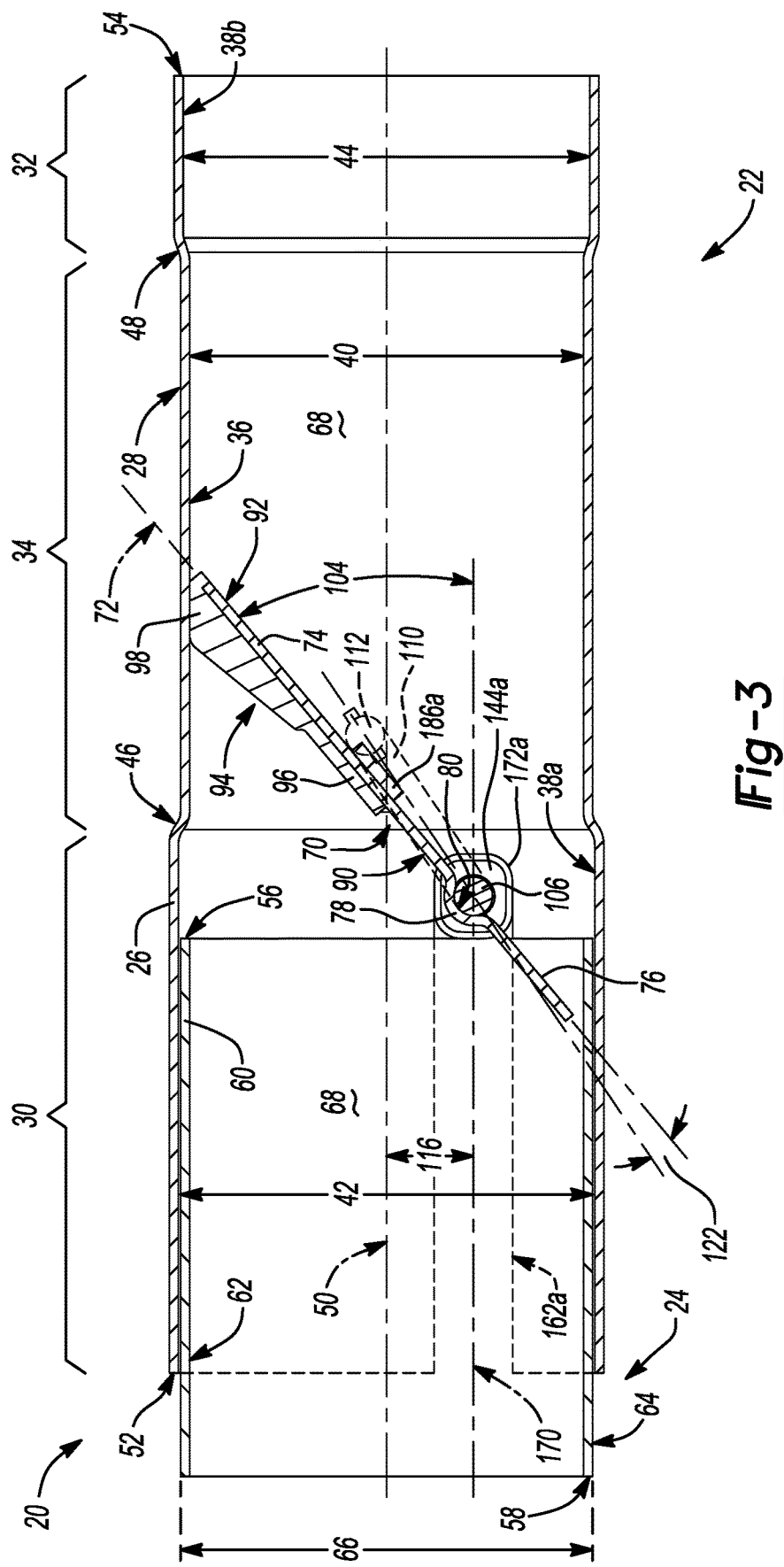
FIG. 3 is a side cross-sectional view of the exemplary snap-action valve assembly shown in FIG. 1 illustrating an exemplary valve flap in a closed position.
Figure 4:
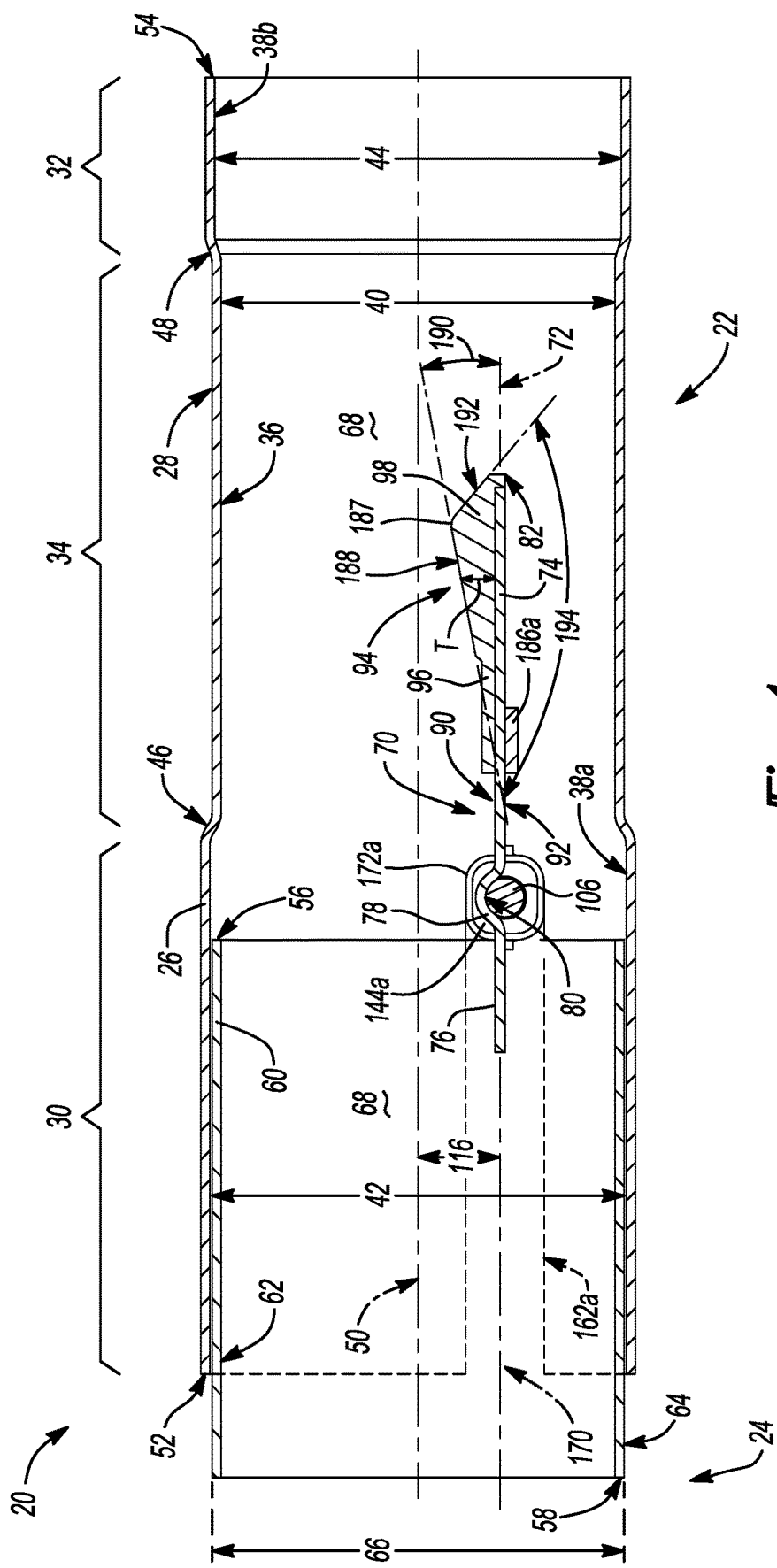
FIG. 4 is a side cross-sectional view of the exemplary snap-action valve assembly shown in FIG. 1 illustrating the exemplary valve flap in an open position.

A shaft 102 supports the valve flap 70 in the first conduit 22 for rotation between a closed position (illustrated in FIG. 3) and an open position (illustrated in FIG. 4). The closed position and the open position of the valve flap 70 are separated by a valve flap travel angle 104. In the illustrated example, the valve flap travel angle 104 equals 40 degrees. When the valve flap 70 is in the closed position as shown in FIG. 3, the end portion 98 of the pad 94 contacts the inside surface 36 of the neck portion 34 of the first conduit 22. When the valve flap 70 is in the open position as shown in FIG. 4, the valve flap 70 is positioned such that the valve flap plane 72 is parallel to the central axis 50. It should be appreciated that the valve flap 70 obstructs exhaust flow through the exhaust passageway 68 when the valve flap 70 is in the closed position and that exhaust flow through the exhaust passageway 68 is relatively unobstructed when the valve flap 70 is in the open position. Notwithstanding, the valve flap 70 need not completely close off the exhaust passageway 68 in the closed position and the open position could be associated with other valve flap 70 orientations where the valve flap plane 72 is not parallel to the central axis 50.

Still referring to FIGS. 1-4, the shaft 102 supporting the valve flap 70 is separated into an axle portion 106, an external shaft segment 108, a lever arm 110, and a spring attachment arm 112. At least part of the axle portion 106 is disposed within the first conduit 22 while the external shaft segment 108, the lever arm 110, and the spring attachment arm 112 are external to the first conduit 22. The axle portion 106 of the shaft 102 extends linearly through the first conduit 22 from the external shaft segment 108 to the lever arm 110 and defines a pivot axis 114 for the valve flap 70. The pivot axis 114 is transverse to the central axis 50 and is spaced from the central axis 50 by an offset distance 116. In other words, the axle portion 106 of the shaft 102 is off-center in the first conduit 22. The valve flap 70 is carried on the axle portion 106 of the shaft 102 where at least part of the axle portion 106 of the shaft 102 is received in the channel 80 of the curved section 78 of the valve flap 70. The curved section 78 of the valve flap 70 is fixedly secured to the axle portion 106 of the shaft 102 such that the axle of the shaft 102 rotates with the valve flap 70. By way of example and without limitation, the curved section 78 of the valve flap 70 may be fixedly secured to the axle portion 106 of the shaft 102 by welding.

The spring attachment arm 112 of the shaft 102 defines a spring attachment arm axis 118 that is parallel to and spaced from the pivot axis 114. The lever arm 110 of the shaft 102 extends transversely from the axle portion 106 of the shaft 102 to the spring attachment arm 112 of the shaft 102 and defines a lever arm axis 120 that is transverse to the pivot axis 114. As best seen in FIGS. 3 and 4, the lever arm axis 120 is arranged at an acute angle 122 relative to the valve flap plane 72. The spring attachment arm 112 of the shaft 102 includes a plurality of knuckles 124 that protrude from the spring attachment arm 112 to define a spring attachment location 126 disposed between the plurality of knuckles 124. Of course, the spring attachment location 126 may be formed on or in the spring attachment arm 112 by alternative structure without departing from the scope of the subject disclosure. It should be appreciated that the shaft 102 may be made of a variety of different materials. By way of non-limiting example, the shaft 102 may be made from SS430 stainless steel and may have an outside diameter of 6 millimeters (mm).

The first conduit 22 includes an anchor post 128 disposed longitudinally between the junction end 52 of the first conduit 22 and the shaft 102. The anchor post 128 extends outwardly from the outside surface 28 of the first conduit 22 and terminates at a free end 130. The free end 130 of the anchor post 128 has a spring retention groove 132. The anchor post 128 defines an anchor post axis 134 that is transverse to and that intersects with the central axis 50. Although the anchor post 128 may be formed in different ways, in the illustrated example, the anchor post 128 is integral with the first conduit 22. In accordance with this arrangement, the anchor post 128 is partially cut out from the first conduit wall 26. As such, the first conduit wall 26 includes an anchor post cut-out 198. The anchor post cut-out 198 remains sealed from the exhaust passageway 68 due to the overlap between the first conduit wall 26 and the second conduit wall 60 along the first enlarged conduit segment 30 of the first conduit 22. The anchor post 128 extends from a bent transition 136 adjacent the first conduit wall 26 to the free end 130 where the spring retention groove 132 is located. Advantageously, manufacturing related speed and cost savings are realized when the anchor post 128 is cut out from the first conduit 22.

A tension spring 138 extends between and is attached to the spring attachment arm 112 of the shaft 102 on one end and the anchor post 128 on the other. Although the tension spring 138 may take a variety of different forms, in the illustrated example, the tension spring 138 has a helical main body 140 that is disposed between first and second hook ends 142a, 142b. The first hook end 142a of the tension spring 138 is retained on the spring attachment arm 112 of the shaft 102 by the plurality of knuckles 124. The second hook end 142b of the tension spring 138 is retained on the anchor post 128 by the spring retention groove 132. The tension spring 138 biases the valve flap 70 to the closed position (FIG. 3). As will be explained in greater detail below, the valve flap 70 pivots open against a biasing force provided by the tension spring 138 when the pressure of the exhaust flowing through the exhaust passageway 68 on the first valve flap ear 74 exceeds the biasing force of the tension spring 138 (FIG. 4). When the pressure of the exhaust flowing through the exhaust passageway 68 on the first valve flap ear 74 becomes less than the biasing force of the tension spring 138, the valve flap 70 returns to the closed position (FIG. 3). The tension spring 138 may be made of a variety of different materials. By way of non-limiting example, the tension spring 138 may be made from Inconel 718 and/or Alloy 41 metals with a proper heat treatment. Although not shown in the drawings, other spring types besides tension springs 138 may be utilized. For example, compression or torsion springs could be used with minor design modifications.

Figure 2:
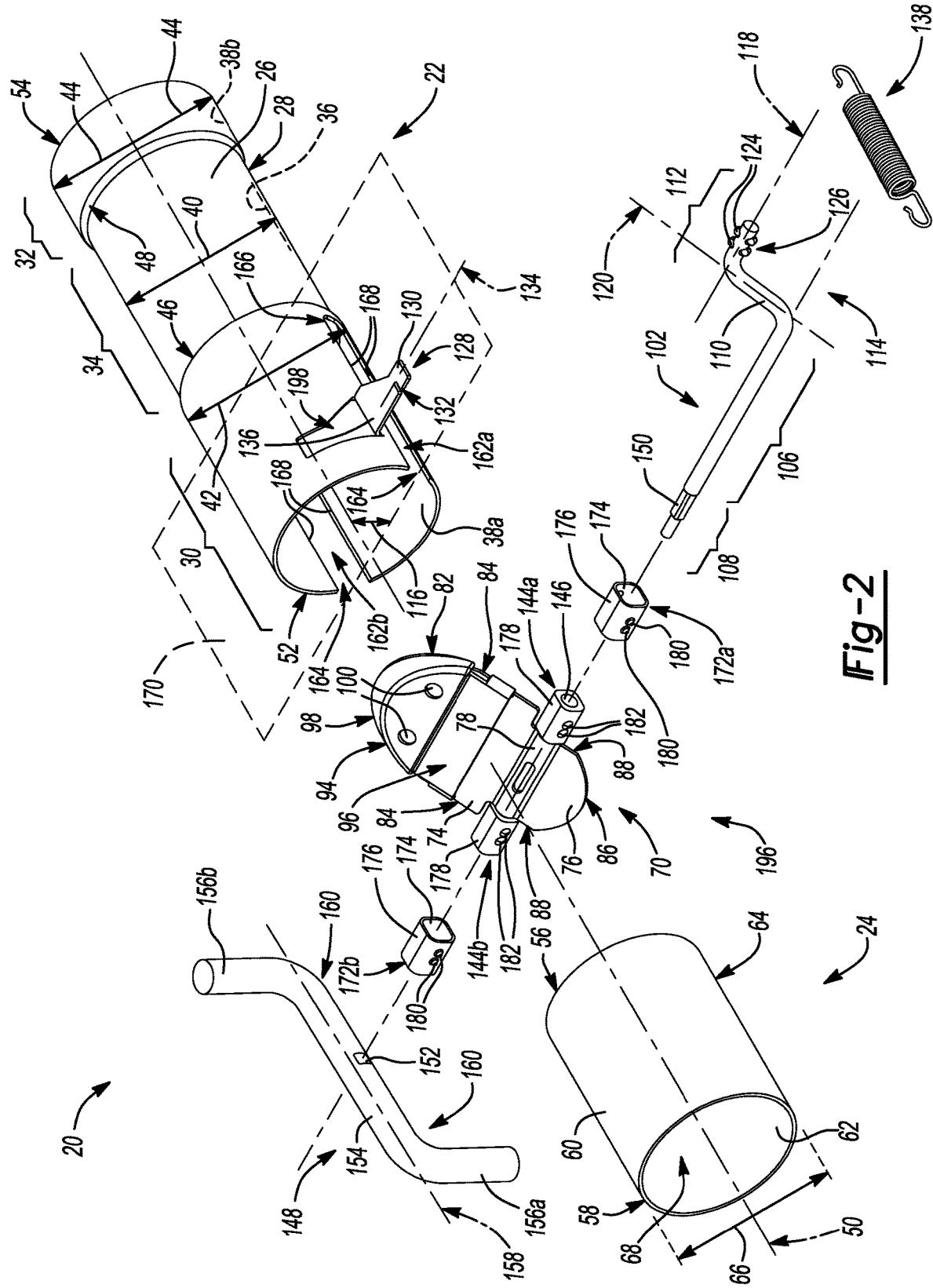
FIG. 2 is an exploded perspective view of the exemplary snap-action valve assembly shown in FIG. 1.

As best seen in FIG. 2, the snap-action valve assembly 20 includes first and second bushings 144a, 144b that support the axle portion 106 of the shaft 102 on the first conduit 22. Each of the first and second bushings 144a, 144b includes a shaft opening 146 where the axle portion 106 of the shaft 102 extends through the shaft openings 146 in the first and second bushings 144a, 144b. As a result, the first and second bushings 144 are disposed around the axle portion 106 of the shaft 102 and between the axle portion 106 of the shaft 102 and the first conduit 22. When the snap-action valve assembly 20 is fully assembled (FIG. 1), the curved second 78 of the valve flap 70 is disposed between the first and second bushings 144*a*, 144*b* and the first and second bushings 144*a*, 144*b* abut the pair of bushing cut-outs 88 in the valve flap 70. Although the first and second bushings 144*a*, 144*b* may be made from a variety of different materials, in the illustrated example, the first and second bushings 144*a*, 144*b* are made of wire mesh. By way of example and without limitation, the wire mesh of the first and second bushings 144*a*, 144*b* may be SS316 stainless steel mesh with a density of approximately 40 percent. The wire mesh may optionally be impregnated with graphite.

As shown in FIGS. 1 and 2, the snap-action valve assembly 20 may optionally include a mass damper 148 that is rotatably coupled to the external shaft segment 108. The mass damper 148 rotates with the shaft 102 and creates a distributed mass that is spaced from the pivot axis 114, which functions to reduce vibration related harmonics (e.g. rattling noises) and excessive valve flutter caused by flow-rate fluctuations in the engine's exhaust flow (e.g. exhaust pulsation). In one example, the mass damper 148 is welded directly to the external shaft segment 108. In the example illustrated in FIG. 2, the external shaft segment 108 includes a keyed surface 150 providing the external shaft segment 108 with a generally rectangular cross-section. The mass damper 148 has an attachment hole 152 that receives the external shaft segment 108. The attachment hole 152 has a complementary shape to the keyed surface 150 of the external shaft segment 108 such that the mass damper 148 rotates with the external shaft segment 108. The mass damper 148 may have a bent configuration, including a linear segment 154, and first and second transverse segments 156*a*, 156*b* giving the mass damper 148 an S-like shape. The linear segment 154 of the mass damper 148 extends along a primary mass damper axis 158 between a pair of damper ends 160. The first and second transverse segments 156*a*, 156*b* of the mass damper 148 extend from the pair of damper ends 160 in opposite transverse directions relative to the primary mass damper axis 158 where the primary mass damper axis 158 is transverse to the pivot axis 114. The mass damper 148 may be made from a variety of different materials. By way of example and without limitation, the mass damper 148 may be made from SS409 stainless steel.

Again referring to FIGS. 1-4, the first conduit 22 further includes first and second slots 162*a*, 162*b*. Each of the first and second slots 162*a*, 162*b* extends through the first conduit wall 26, longitudinally along the first enlarged segment of the first conduit 22 from an open slot end 164 to a closed slot end 166. Each of the first and second slots 162*a*, 162*b* also have opposing linear edges 168 that run parallel to each other between the open slot ends 164 and the closed slot ends 166. The open slot ends 164 are positioned at the junction end 52 of the first conduit 22 while the closed slot ends 166 are positioned between the junction end 52 and the first transition 46 of the first conduit 22. Although the first and second slots 162*a*, 162*b* may be curved or extend at an angle relative to the central axis 50 without departing from the scope of the subject disclosure, in the illustrated example, the first and second slots 162*a*, 162*b* extend parallel to one another in a slot plane 170 that is parallel to and spaced from the central axis 50 of the first conduit 22 by the offset distance 116. As such, the pivot axis 114 of the valve flap 70 extends in the slot plane 170. Each of the first and second slots 162*a*, 162*b* is sized to receive and support one of the first and second bushings 144. Advantageous, the first and second slots 162*a*, 162*b* provide manufacturing related speed and cost savings.

The snap-action valve assembly 20 also includes first and second bushing sleeves 172*a*, 172*b* that support the first and second bushings 144*a*, 144*b* within the first and second slots 162*a*, 162*b* respectively. Each of the first and second bushing sleeves 172*a*, 172*b* includes a bushing cavity 174 that receives and supports one of the first and second bushings 144*a*, 144*b*. After assembly, the first and second bushings 144*a*, 144*b* and the first and second bushing sleeves 172*a*, 172*b* form first and second bushing subassemblies 173*a*, 173*b*. When the snap-action valve assembly 20 is fully assembled, each of the first and second bushing sleeves 172*a*, 172*b* is slidingly received in one of the first and second slots 162*a*, 162*b* such that the first and second bushing sleeves 172*a*, 172*b* are disposed between the insertion end 56 of the second conduit 24 and the closed slot ends 166. Consequently, the first and second bushing sleeves 172*a*, 172*b* are disposed between the first and second bushings 144*a*, 144*b* on one side and the closed slot ends 166, the opposing linear edges 168 of the first and second slots 162*a*, 162*b*, and the insertion end 56 of the second conduit 24 on the other. Because the closed slot ends 166, the opposing linear edges 168, and the insertion end 56 of the second conduit 24 are relatively thin and sharp, the first and second bushing sleeves 172*a*, 172*b* protect the first and second bushings 144*a*, 144*b* from wear by these sharp edges/surfaces. The first and second bushing sleeves 172*a*, 172*b* also prevent over compression of the first and second bushings 144*a*, 144*b* when the insertion end 56 of the second conduit is inserted into the junction end 52 of the first conduit 22. It should be appreciated that while not shown in the Figures, the insertion end 56 of the second conduit 24 need not define a straight edge, but could alternatively include one or more slots, depressions, or semi-circular notches that interface with the first and second bushing sleeves 172*a*, 172*b*.

Each of the first and second bushing sleeves 172*a*, 172*b* has one or more flat portions 176 that contact the opposing linear edges 168 of the first and second slots 162*a*, 162*b* to prevent rotation of the first and second bushing sleeves 172*a*, 172*b* within the first and second slots 162*a*, 162*b* relative to the pivot axis 114. Similarly, each of the first and second bushings 144*a*, 144*b* has one or more flats 178 that contact the one or more flat portions 176 of the first and second bushing sleeves 172*a*, 172*b*. The flats 178 of the first and second bushings 144*a*, 144*b* match the flat portions 176 of the first and second bushing sleeves 172*a*, 172*b* and therefore prevent rotation of the first and second bushings 144*a*, 144*b* within the first and second bushing sleeves 172*a*, 172*b* relative to the pivot axis 114. While other configuration are possible, in the illustrated example, each of the first and second bushings 144*a*, 144*b* has two flats 178 and each of the first and second bushing sleeves 172*a*, 172*b* has two flat portions 176, giving the first and second bushings 144*a*, 144*b* and the first and second bushing sleeves 172*a*, 172*b* a generally square-shaped cross-sections.

Each of the first and second bushing sleeves 172*a*, 172*b* also has one or more protrusions 180 that extend inwardly from the first and second bushing sleeves 172*a*, 172*b* into the bushing cavities 174. The first and second bushings 144*a*, 144*b* are provided with one or more dimples 182 that are aligned with the protrusions 180 in the first and second bushing sleeves 172*a*, 172*b*. When the first and second bushing sleeves 172*a*, 172*b* are slidingly received in the first and second slots 162*a*, 162*b* to form first and second bushing subassemblies 173*a*, 173*b*, the protrusions 180 of the first and second bushing sleeves 172*a*, 172*b* and extend into the dimples 182 in the first and second bushings 144*a*, 144*b*. As a result, the protrusions 180 prevent axial movement of the first and second bushings 144*a*, 144*b* relative to the first and second bushing sleeves 172a, 172b along the pivot axis 114 (i.e. parallel to the pivot axis 114).

Figure 5:
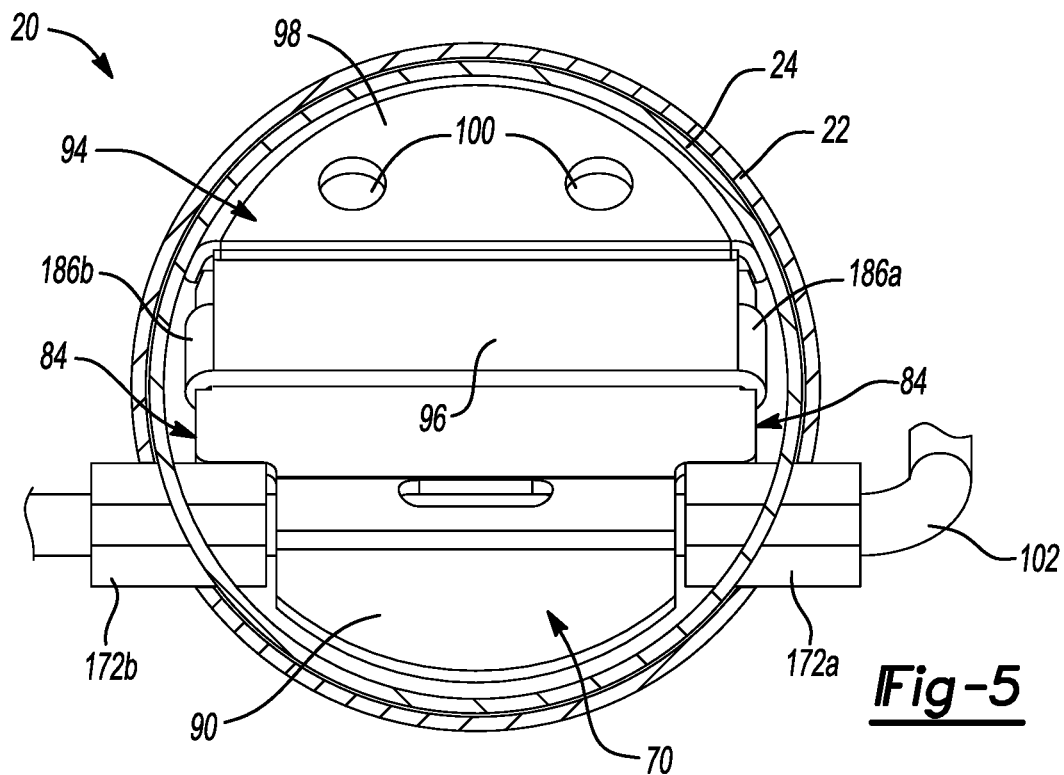
FIG. 5 is front elevation view of the exemplary snap-action valve assembly shown in FIG. 1 illustrating the exemplary valve flap in the closed position.
Figure 6:
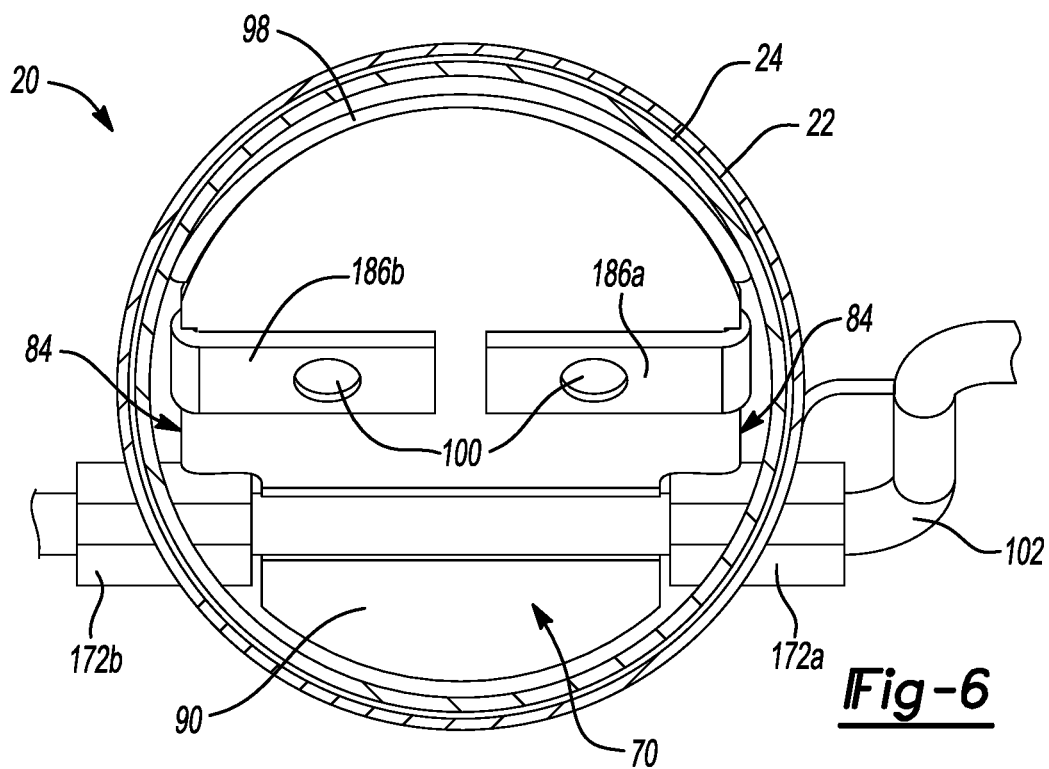
FIG. 6 is rear elevation view of the exemplary snap-action valve assembly shown in FIG. 1 illustrating the exemplary valve flap in the closed position.

With additional reference to FIGS. 5 and 6, the valve flap 70 has a first side 90 and a second side 92 that is opposite the first side 90. As shown in FIGS. 1-6, the valve flap 70 may be arranged in the first conduit 22 such that the first side 90 of the valve flap 70 faces the junction end 52 of the first conduit 22 and the second side 92 of the valve flap 70 faces the distal end 54 of the first conduit 22 when the valve flap 70 is in the closed position (FIG. 3). Alternatively, the valve flap 70 may be turned around in the first conduit 22 such that the first side 90 of the valve flap 70 faces the distal end 54 of the first conduit 22 and the second side 92 of the valve flap 70 faces the junction end 52 of the first conduit 22 when the valve flap 70 is in the closed position (not shown). Regardless of the arrangement, the pad 94 is carried on the first side 90 of the valve flap 70. The pad 94 includes first and second side wings 186a, 186b that extend from the body portion 96 of the pad 94. The first and second side wings 186a, 186b wrap around the linear side edges 84 of the valve flap ear 70 to the second side 92 of the valve flap 70. The first and second side wings 186a, 186b extend at least partially across the second side 92 of the valve flap 70 and may be attached to the second side 92 of the valve flap 70 by spot welds 100. The first and second side wings 186a, 186b of the pad 94 contact the inside surface 36 of the first conduit 22 when the valve flap 70 is in the open position (FIG. 4) to dampen vibration related harmonics (e.g. rattle) and excessive valve flutter caused by flowrate fluctuations in the engine's exhaust flow (e.g. exhaust pulsation).

As best seen in FIG. 4, the pad 94 is solid and has a variable thickness T that increases moving from the body portion 96 of the pad 94 to a peak 187 located along the end portion 98 of the pad 94. The variable thickness T of the pad 94 decreases moving from the peak 187 to the first arcuate edge 82 of the first valve flap ear 74 of the valve flap 70. Accordingly, the end portion 98 of the pad 94 includes an abutment surface 188 that extends from the body portion 96 of the pad 94 at a first angle 190 relative to the valve flap plane 72 and an end surface 192 that extends from the abutment surface 188 of the pad 94 to the first arcuate edge 82 of the first valve flap ear 74 of the valve flap 70 at a second angle 194 relative to the abutment surface 188 of the pad 94. The first angle 190 between the abutment surface 188 of the pad 94 and the valve flap plane 72 may be any acute angle, but in the illustrated example, the first angle 190 ranges from 13 to 18 degrees. The second angle 194 between the end surface 192 of the pad 94 and the abutment surface 188 of the pad 94 may be any obtuse angle, but in the illustrated example, the second angle ranges from 127 to 132 degrees.

In operation, exhaust pressure in the exhaust passageway 68 is incident on valve flap 70 from the left as viewed in FIGS. 1-4. When the exhaust pressure is sufficient to overcome the biasing force of tension spring 138, the valve flap 70 will start to rotate about the pivot axis 114. With reference to FIG. 1, the torque on valve flap 70 is determined by the biasing force of the tension spring 138 multiplied by distance D, which is the distance between a longitudinal axis A of the tension spring 138 and the pivot axis 114 of the valve flap 70. The biasing force increases as the valve flap 70 moves toward the open position (FIG. 4) and the tension spring 138 stretches. However, distance D gets shorter as the valve flap 70 continues to move towards the open position resulting in the torque approaching zero as the longitudinal axis A of the tension spring 138 approaches an "over-center" position (i.e., as the longitudinal axis A of the tension spring 138 crosses the pivot axis 114 and the valve flap plane 72. This over-center positioning of the valve flap 70 results in a substantially horizontal position of the valve flap 70 when the valve flap 70 is in the open position (FIG. 4). Rotating the valve flap 70 such that the tension spring 138 approaches the over center condition results in an easier maintenance of the valve flap 70 in the open position, which, in turn, minimizes back pressure in the exhaust passageway 68 when the valve flap 70 is in the open position.

Figure 7A:
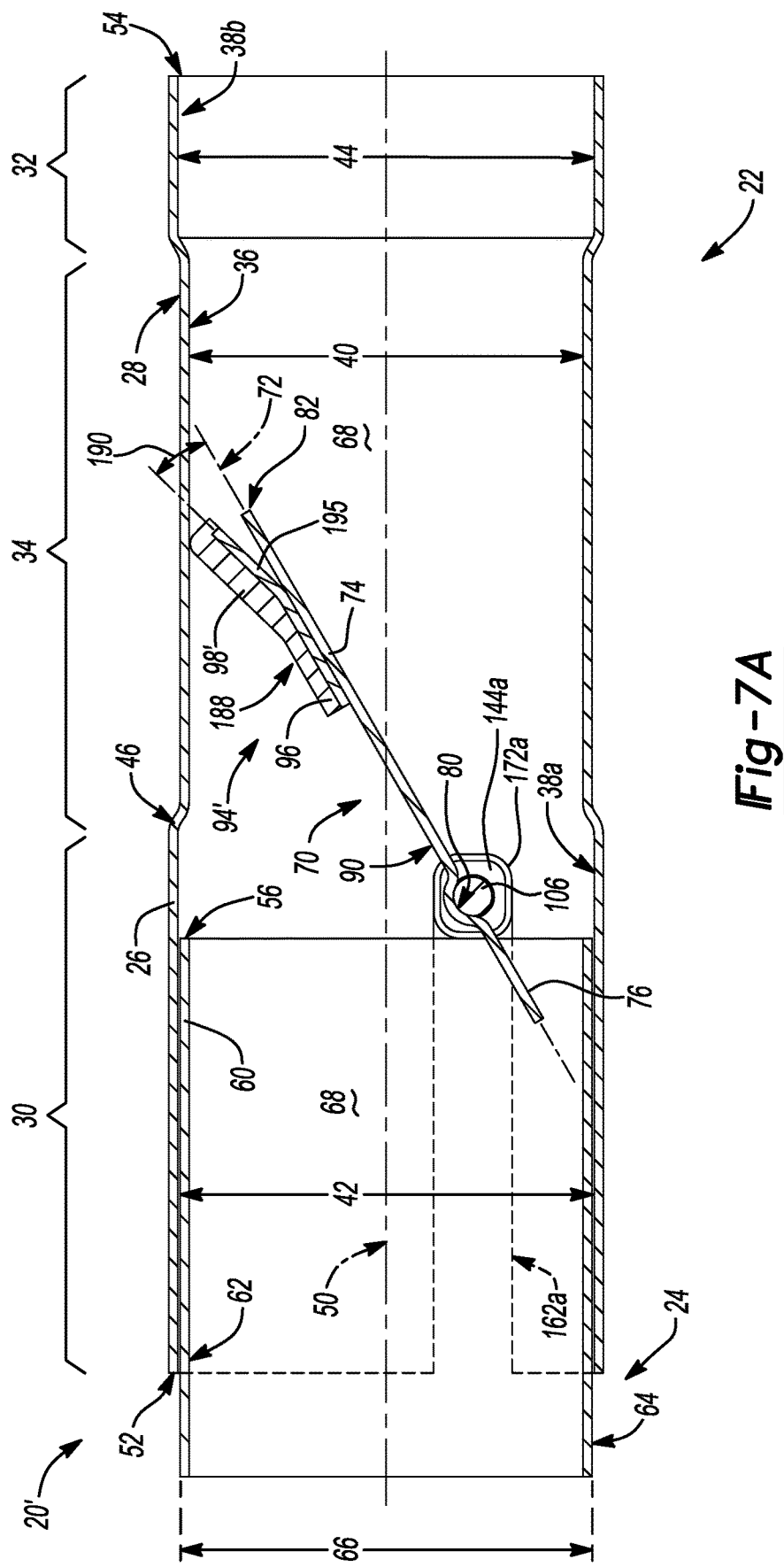
FIG. 7A is a side cross-sectional view of another exemplary snap-action valve assembly that is constructed in accordance with the subject disclosure, which includes a resilient tongue attached to the first valve flap ear of an exemplary valve flap.

FIG. 7A illustrates another snap-action valve assembly 20' that is the same as the snap-action valve assembly 20 illustrated in FIGS. 1-6, but where the valve flap 70 and the pad 94 have been modified. In FIG. 7A, a resilient tongue 195 is provided that is attached to the first side 90 of the valve flap 70. A pad 94' is attached to and supported by the resilient tongue 195. The resilient tongue 195 is bent at an angle such that an end portion 98' of the pad 94' is spaced away from the first arcuate edge 82 of the valve flap 70. The resilient tongue 195 extends from the first valve flap ear 74 at the first angle 190 relative to the valve flap plane 72. In operation, the resilient tongue 195 of the valve flap 70 deflects towards the first arcuate edge 82 of the valve flap 70 as the end portion 98' of the pad 94' makes contact with the inside surface 36 of the first conduit 22 to dampen vibration related harmonics and excessive valve flutter caused by flowrate fluctuations in the engine's exhaust flow. As such, the first angle 190 of the resilient tongue 195 changes relative to the valve flap plane 72 when the end portion 98' of the pad 94' makes contact with the inside surface 36 of the first conduit 22.

Figure 7B:
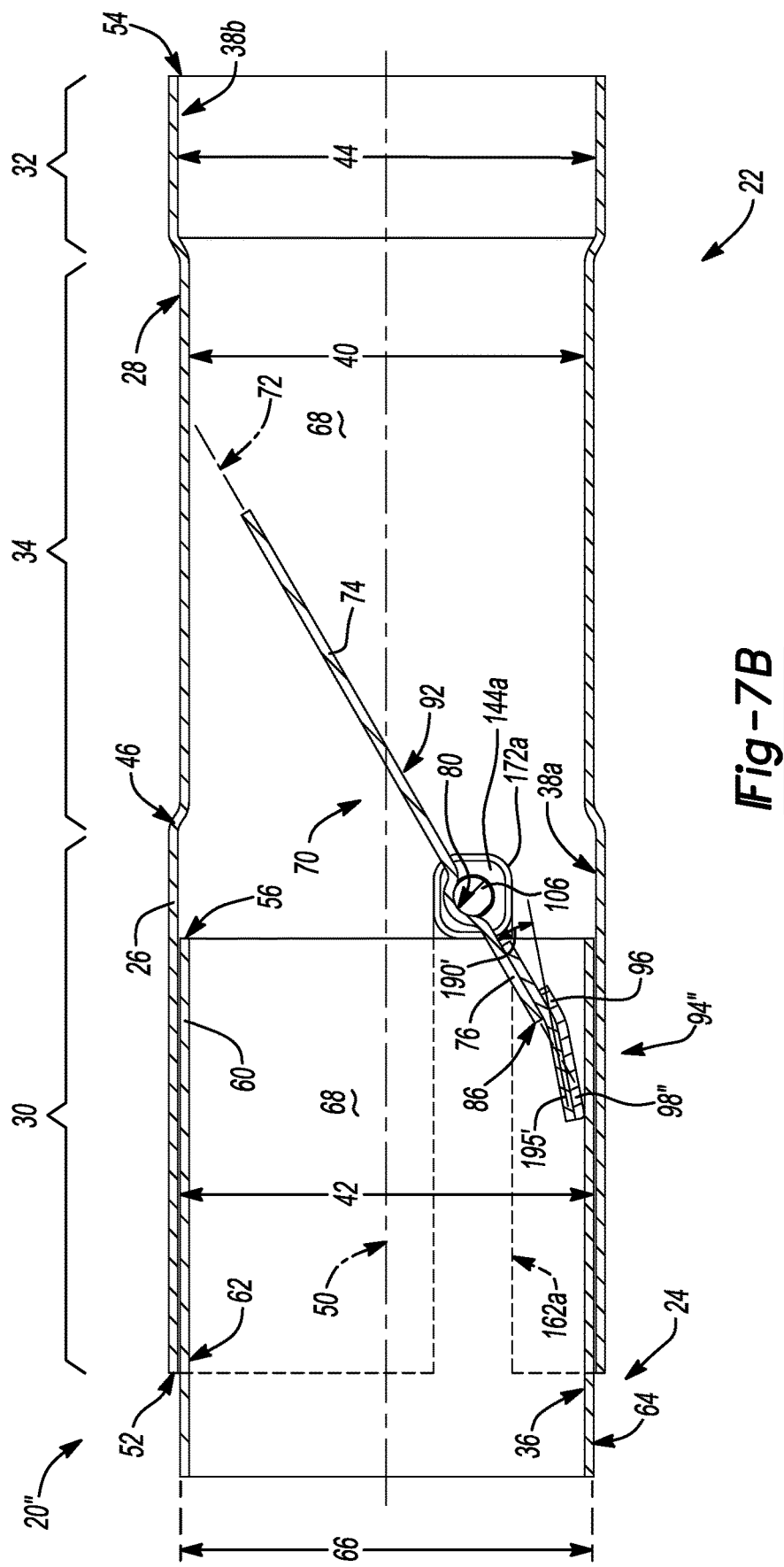
FIG. 7B is a side cross-sectional view of another exemplary snap-action valve assembly that is constructed in accordance with the subject disclosure, which includes a resilient tongue attached to the second valve flap ear of an exemplary valve flap.

FIG. 7B illustrates yet another snap-action valve assembly 20" that is the same as the snap-action valve assembly 20' illustrated in FIG. 7A, but where the valve flap 70 and the pad 94' have been modified. In FIG. 7B, a resilient tongue 195' is provided that is attached to the second side 92 of the valve flap 70. A pad 94" is attached to and supported by the resilient tongue 195'. The resilient tongue 195' is bent at an angle such that an end portion 98" of the pad 94" is spaced away from the second arcuate edge 86 of the valve flap 70. The resilient tongue 195' extends from the second valve flap ear 76 at a first angle 190' relative to the valve flap plane 72. In operation, the resilient tongue 195' of the valve flap 70 deflects away from the valve flap plane 72 as the end portion 98" of the pad 94" makes contact with the inside surface 36 of the second conduit 24 to dampen vibration related harmonics and excessive valve flutter caused by flowrate fluctuations in the engine's exhaust flow. As such, the first angle 190' of the resilient tongue 195' changes relative to the valve flap plane 72 when the end portion 98" of the pad 94" makes contact with the inside surface 36 of the second conduit 24.

Although the resilient tongue 195, 195' shown in the examples illustrated in FIGS. 7A and 7B is a separate piece of material that is welded to the valve flap 70, the resilient tongue 195, 195' may alternatively be integral with the valve flap 70 where the valve flap 70 would have a bent or Y-shaped end. Additionally, it should be appreciated that the resilient tongue 195, 195' of the valve flap 70 may be eliminated by making the pad 94', 94" out of a material that itself is resilient enough to deflect and then spring back to the first angle 190, 190' as the valve flap 70 is pivoted to the closed position and away from the closed position.

Figure 8:
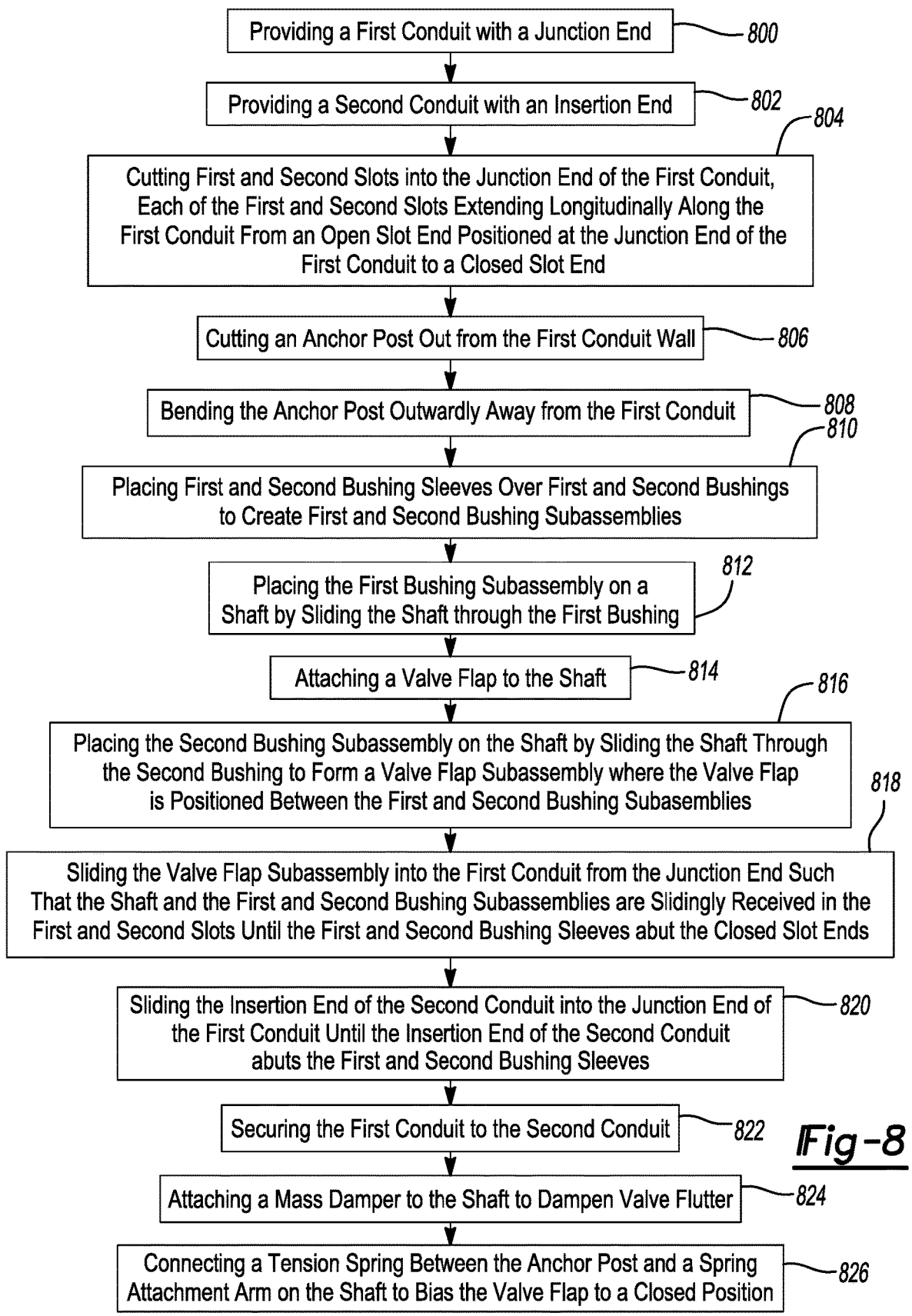
FIG. 8 is a flow diagram illustrating an exemplary method of manufacture for the exemplary snap-action valve assemblies disclosed herein.

With reference to FIG. 8, the subject disclosure further provides a method of manufacturing the snap-action valve assemblies 20 discussed above. The method includes the step illustrated by block 800 of providing a first conduit 22 with a junction end 52 and the step illustrated by block 802 of providing a second conduit 24 with an insertion end 56.

The method proceeds with the step illustrated by block 804 of cutting the first and second slots 162a, 162b into the junction end 52 of the first conduit 22. In accordance with this step, each of the first and second slots 162a, 162b are cut so as to extend longitudinally along the first conduit 22 from an open slot end 164 positioned at the junction end 52 of the first conduit 22 to a closed slot end 166. Optionally, the method further comprises the step illustrated by block 806 of cutting the anchor post 128 out from the first conduit wall 26 and the step illustrated by block 808 of bending the anchor post 128 outwardly away from the first conduit 22. The method further includes the step illustrated by block 810 of placing first and second bushing sleeves 172a, 172b over first and second bushings 144a, 144b to create first and second bushing subassemblies 173a, 173b (FIG. 1). The method proceeds with the step illustrated by block 812 of placing the first bushing subassembly 173a on a shaft 102 by sliding the shaft 102 through the first bushing 144a, the step illustrated by block 814 of attaching the valve flap 70 to the shaft 102, and the step illustrated by block 816 of placing the second bushing subassembly 173b on the shaft 102 by sliding the shaft 102 through the second bushing 144b to form a valve flap subassembly 196 where the valve flap 70 is positioned on the shaft 102 between the first and second bushing subassemblies 173a, 173b (FIG. 1). Accordingly, the valve flap subassembly 196 that includes the valve flap 70, the shaft 102, the first and second bushings 144a, 144b, and the first and second bushing sleeves 172a, 172b (i.e. the first and second bushing subassemblies 173a, 173b). Although the step illustrated by block 814 may be performed in a number of different ways, the valve flap 70 may be attached to the shaft 102 by welding.

The method further comprises the step illustrated by block 818 of sliding the valve flap subassembly 196 into the first conduit 22 from the junction end 52. In accordance with this step, the shaft 102, the first and second bushing subassemblies 173a, 173b are slidingly received in the first and second slots 162a, 162b until the first and second bushing sleeves 172a, 172b abut the closed slot ends 166. The method proceeds with the step illustrated by block 820 of sliding the insertion end 56 of the second conduit 24 into the junction end 52 of the first conduit 22 until the insertion end 56 of the second conduit 24 abuts the first and second bushing sleeves 172a, 172b. The method continues with the step illustrated by block 822 of securing the first conduit 22 to the second conduit 24. Although the step illustrated by block 822 may be performed in a number of different ways, the first conduit 22 may be secured to the second conduit 24 continuous or spot welds using MIG, TIG, or laser welding equipment. Optionally, the method further comprises the step illustrated by block 824 of attaching a mass damper 148 to the shaft 102 to dampen vibration related harmonics and reduce excessive valve flutter caused by flowrate fluctuations in the engine's exhaust flow (i.e. exhaust pulsation). Although the step illustrated by block 824 may be performed in a number of different ways, mass damper 148 may be attached to the shaft 102 by welding. The method may also include the optional step illustrated by block 826 of connecting a tension spring 138 between the anchor post 128 and a spring attachment arm 112 on the shaft 102 to bias the valve flap 70 to a closed position.

With reference to FIGS. 9-11, an exemplary application of the snap-action valve assembly 20 described above is illustrated. An automotive exhaust system muffler 900 including a housing 902 is provided. The muffler 900 includes an outer shell 904 having a substantially oval cross-sectional shape closed at inlet and outlet ends by an inlet header 906 and an outlet header 908. A partition 910 is attached to the outer shell 904 at a position to define a first muffler chamber 912 between the inlet header 906 and the partition 910. A second muffler chamber 914 is defined as the volume between the partition 910 and the outlet header 908. The partition 910 includes a plurality of apertures 916 extending therethrough that enable fluid communication between the first muffler chamber 912 and the second muffler chamber 914. A sound absorbing material 918, such as fiberglass roving, may be positioned within the first muffler chamber 912. No sound absorbing material is placed within the second muffler chamber 914. A pipe 920 includes an inlet section 922 and an outlet section 924. The inlet header 906 includes an aperture 930 that receives the inlet section 922 of the pipe 920. The outlet section 924 of the pipe 920 is connected to the second conduit 24 of the snap-action valve assembly 20 described above. The outlet header 908 includes an aperture 932 that receives the second conduit 24 of the snap-action valve assembly 20. The pipe 920 is bent such that the inlet section 922 is centered with the housing 902 while the outlet section 924 is not centered with the housing 902. The partition 910 includes an aperture 938 that receives the pipe 920. An overlapping joint between the outlet section 924 and the second conduit 24 of the snap-action valve assembly 20 is aligned with and supported by the partition 910. The pipe 920 includes a plurality of apertures 942 that are positioned to provide fluid communication between the pipe 920 and the first muffler chamber 912.

The valve flap 70 of the snap-action valve assembly 20, as previously described in conjunction with FIGS. 1-6, is positioned in the second muffler chamber 914 between the partition 910 and the outlet header 908. More particularly, when the valve flap 70 is in the closed position, exhaust will enter the pipe 920, pass through the apertures 942, enter the first muffler chamber 912, pass through the apertures 916, and enter the second muffler chamber 914. When the valve flap 70 is in the closed position, a relatively small volume flow rate of exhaust passes through a gap between the valve flap 70 and an inside surface 36 of the first conduit 22. The small gap between the valve flap 70 and the inside surface 36 of the first conduit 22 functions to absorb low frequencies within the snap-action valve assembly 20. Because the first conduit 22 of the snap-action valve assembly 20 is a closed cylindrical member, exhaust does not flow through the first muffler chamber 912 and the second muffler chamber 914. Acoustical waves are present, but the volume flow rate of exhaust through the first muffler chamber 912 and the second muffler chamber 914 is minimal. In addition, the sound absorbing material 918 functions to attenuate noise regardless of the position of valve flap 70. When the exhaust pressure is high enough to overcome the biasing force of the tension spring 138. The valve flap 70 rotates toward the open position. At the open position, the valve flap 70 extends substantially horizontally within the first conduit 22 to minimize back pressure in the muffler 900. It should be appreciated that since no sound absorbing material is placed within the second muffler chamber 914, no interference between the sound absorbing material 918 and the snap-action valve assembly 20 occurs.

An upstream end 954 of a tail pipe 952 is coupled in fluid communication with the first conduit 22 of the snap-action valve assembly 20. The tail pipe 952 includes an outlet 950 in fluid communication with the atmosphere. Resonance may exist within the tail pipe 952 and the portion of the first conduit 22 that is downstream from the valve flap 70 due to standing exhaust waves that can form in this portion of the exhaust system. In previous exhaust systems, the outlet 950 of the tail pipe 952 was placed in open fluid communication with an expanded volume inside the outer shell 904 of the muffler 900. The expanded volume functioned to amplify and/or further excite a resonant condition within the tail pipe 952 leading to undesirable noise. In accordance with the subject disclosure, the axial position of the snap-action valve assembly 20 may be selected to minimize resonance that may occur within the tail pipe 952 and the muffler 900. More specifically, the valve flap 70 may be positioned at the upstream end 954 of the tail pipe 952 and proximate to the outlet header 908. More particularly, the shaft 102 of the snap-action valve assembly 20 is axially spaced from the outlet header 908 a distance less than or equal to one-quarter the distance between the inlet header 906 and the outlet header 908. By positioning the snap-action valve assembly 20 at a location downstream from the apertures 942, the first chamber 912 and the second muffler chamber 914 are isolated from the tail pipe 952 and undesirable resonance or "exhaust drone" is avoided. Regardless of the angular position of valve flap 70, one hundred percent of the exhaust flows through the snap-action valve assembly 20.

Figure 12A:
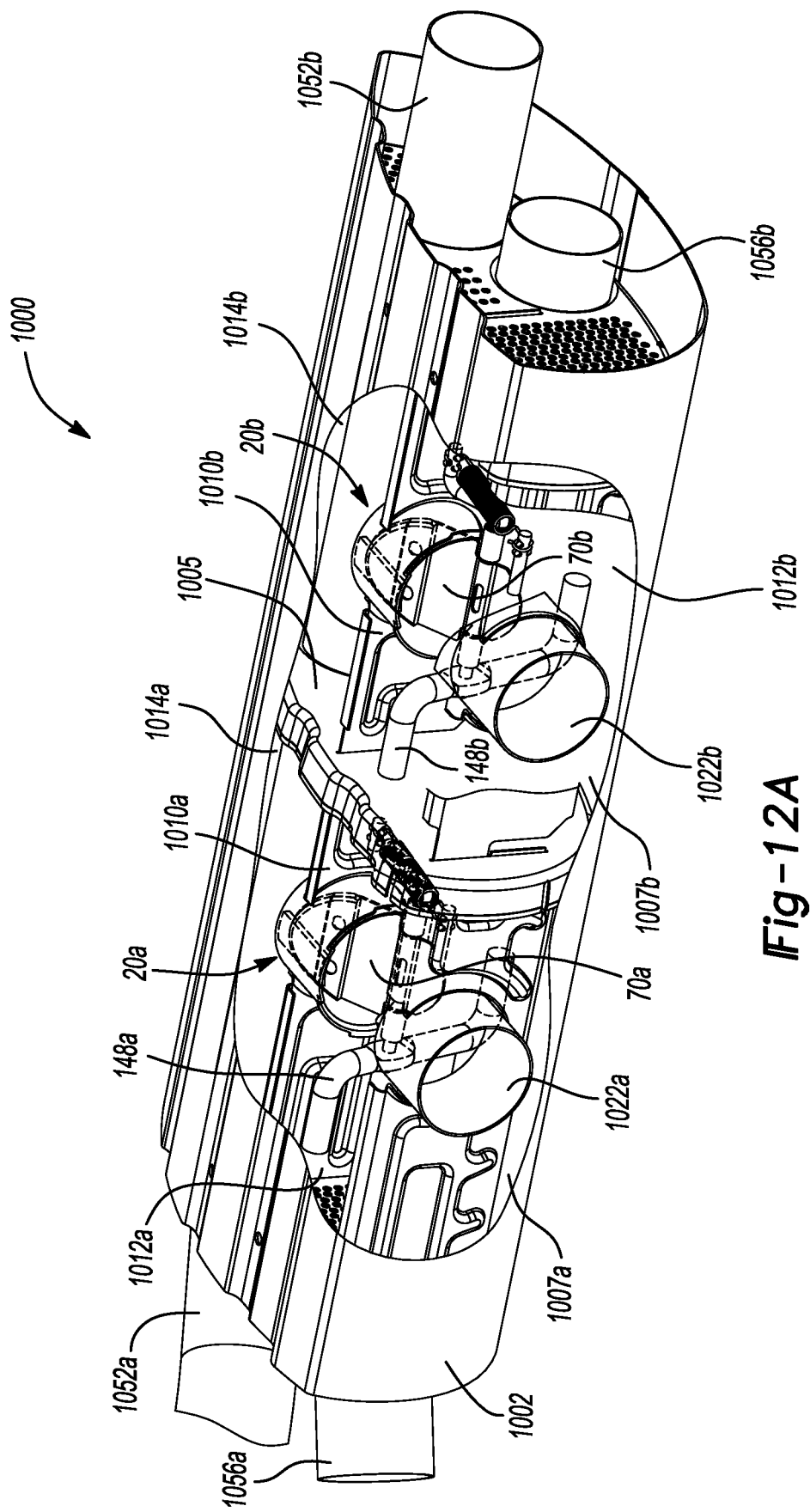
FIG. 12A is a front perspective view of another exemplary exhaust muffler that includes two of the exemplary snap-action valve assemblies illustrated in FIG. 1 where the snap-action valve assemblies are shown in the closed position.
Figure 12B:
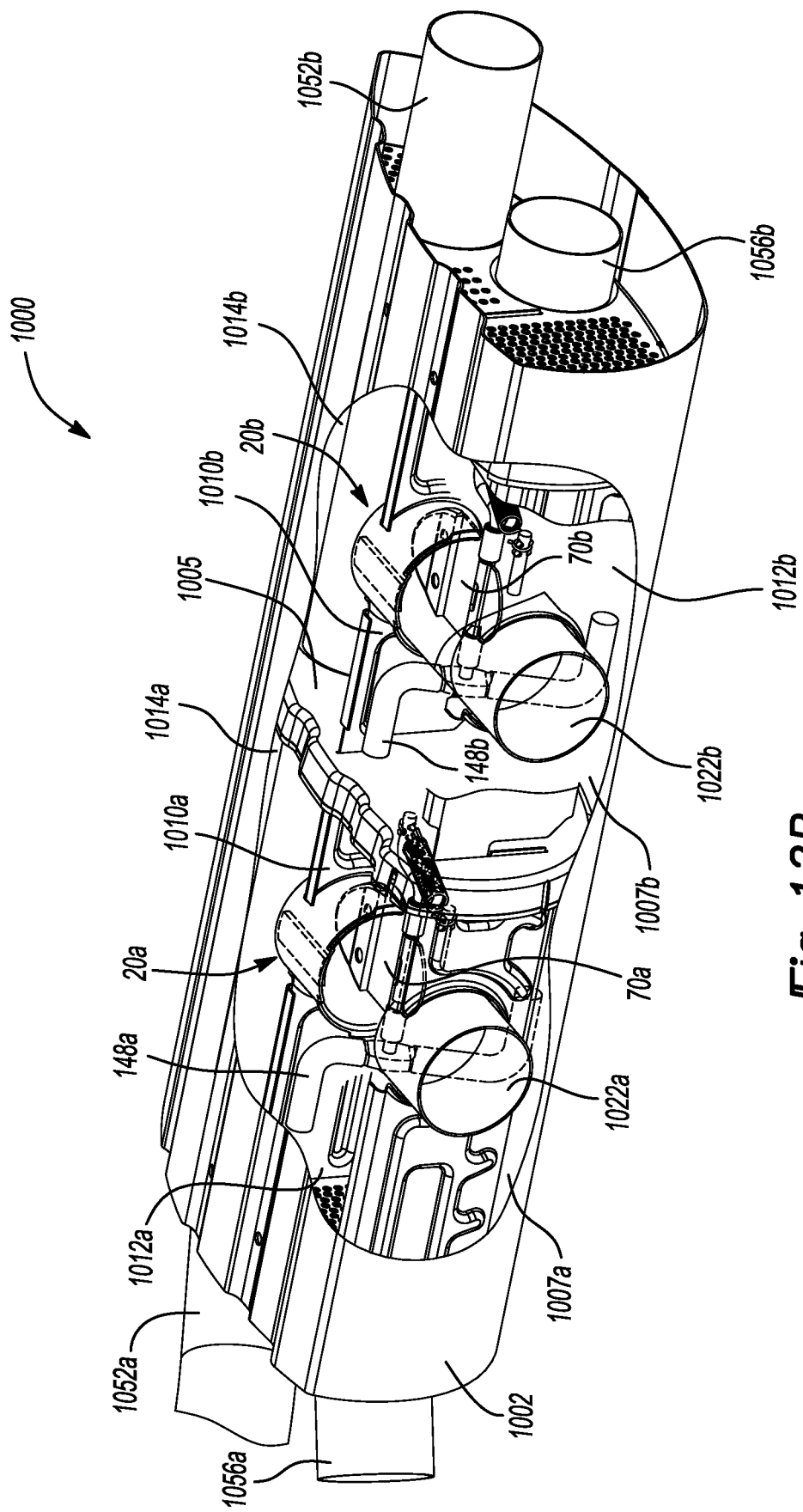
FIG. 12B is a front perspective view of the exemplary exhaust muffler shown in FIG. 12A where the snap-action valve assemblies are shown in the open position.

With reference to FIGS. 12A-B, another exemplary muffler 1000 is illustrated. The muffler 1000 includes a housing 1002. A dividing wall 1005 is disposed within the housing 1002 that divides the muffler 1000 into a first section 1007a and a second section 1007b. The muffler 1000 includes first and second snap-action valve assemblies 20a, 20b, which are constructed in accordance with the disclosure set forth herein. The first snap-action valve assembly 20a is disposed within the housing 1002 in the first section 1007a of the muffler 1000 and the second snap-action valve assembly 20b is disposed within the housing 1002 in the second section 1007b of the muffler 1000.

The first section 1007a of the muffler 1000 includes a first partition 1010a that divides the first section 1007a of the muffler 1000 into a first muffler chamber 1012a and a second muffler chamber 1014a. The first snap-action valve assembly 20a includes a first valve flap 70a and a first mass damper 148a, which are constructed in accordance with the disclosure set forth herein. The first snap-action valve assembly 20a extends through the first partition 1010a and communicates with a first inlet pipe 1022a that extends into the first muffler chamber 1012a and a first outlet pipe 1052a that extends into the second muffler chamber 1014a. A second outlet pipe 1056a communicates with and extends into the first muffler chamber 1012a. When the first valve flap 70a is in a closed position (as shown in FIG. 12A), exhaust cannot flow through the first snap-action valve assembly 20a and into the first outlet pipe 1052a. Accordingly, exhaust flow is directed into the first muffler chamber 1012a and out through the second outlet pipe 1056a. When the first valve flap 70a is in an open position (as shown in FIG. 12B), exhaust can flow through the first snap-action valve assembly 20a and into the first outlet pipe 1052a.

The second section 1007b of the muffler 1000 includes a second partition 1010b that divides the second section 1007b of the muffler 1000 into a third muffler chamber 1012b and a fourth muffler chamber 1014b. The second snap-action valve assembly 20b includes a second valve flap 70b and a second mass damper 148b, which are constructed in accordance with the disclosure set forth herein. The second snap-action valve assembly 20b extends through the second partition 1010b and communicates with a second inlet pipe 1022b that extends into the second muffler chamber 1012b and a third outlet pipe 1052b that extends into the fourth muffler chamber 1014b. A fourth outlet pipe 1056b communicates with and extends into the third muffler chamber 1012b. When the first valve flap 70b is in a closed position (as shown in FIG. 12A), exhaust cannot flow through the second snap-action valve assembly 20b and into the third outlet pipe 1052b. Accordingly, exhaust flow is directed into the third muffler chamber 1012b and out through the fourth outlet pipe 1056b. When the second valve flap 70b is in an open position (as shown in FIG. 12B), exhaust can flow through the second snap-action valve assembly 20b and into the third outlet pipe 1052b.

The first and third outlet pipes 1052a, 1052b may be connected to one another at the dividing wall 1005 and may communicate with one another to equalize exhaust gas pressure in the first and third outlet pipes 1052a, 1052b. From FIGS. 12A-B, it should be appreciated that the size and shape of the first and second mass dampers 148a, 148b of the first and second snap-action valve assemblies 20a, 20b may be dictated by the size and shape of the housing 1002 of the muffler 1000. The goal being to place as much weight of the first and second mass dampers 148a, 148b near the housing 1002 of the muffler 1000 as possible without having the housing 1002 of the muffler 1000 interfere with rotation of the first and second mass dampers 148a, 148b as the first and second valve flaps 70a, 70b of the first and second snap-action valve assemblies 20a, 20b rotate between the open and closed positions. To this end, several possible configurations are described below.

Figure 13A:
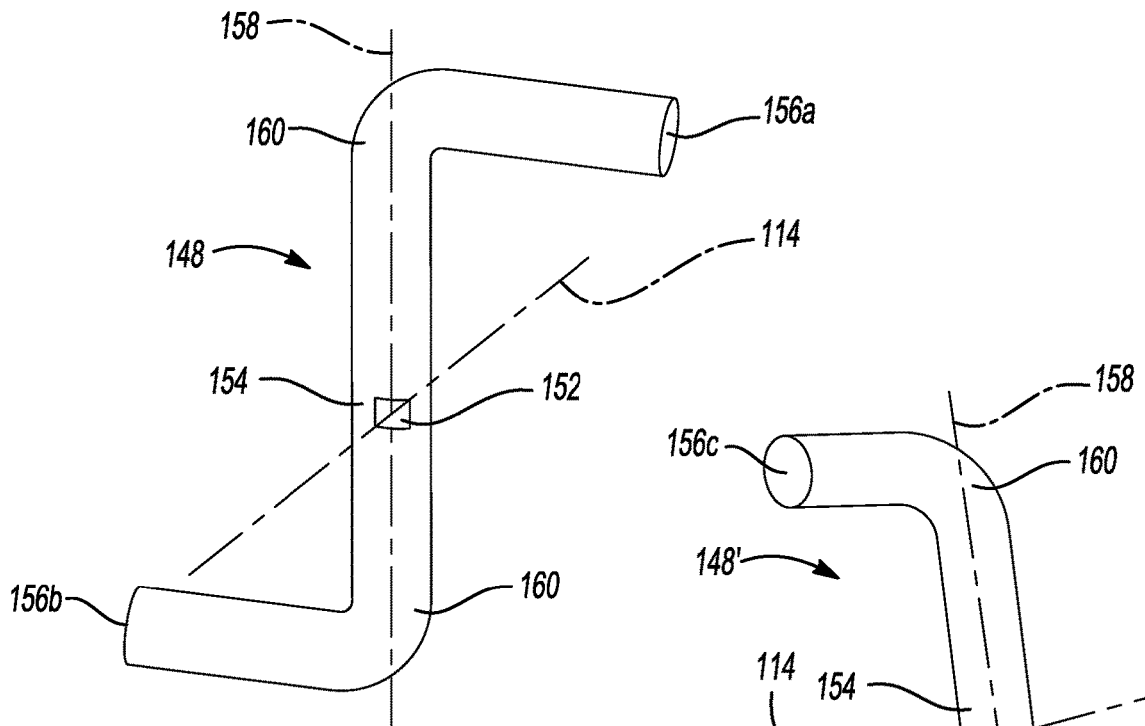
FIG. 13A is a side perspective view of the exemplary mass damper of the snap-action valve assembly shown in FIG. 2.

FIG. 13A illustrates the mass damper 148 of the snap-action valve assembly 20 shown in FIGS. 1 and 2. The shape of the mass damper 148 is important because the mass damper 148 rotates with the shaft 102 and creates a distributed mass that is spaced from the pivot axis 114 of the shaft 102. The distributed mass created by the mass damper 148 gives the mass damper 148 a inertial value that ranges from 250 to 400 gram—square millimeters (g·mm$^2$) and functions to reduce vibration related harmonics (e.g. rattling noises) and excessive valve flutter caused by flowrate fluctuations in the engine's exhaust flow (e.g. exhaust pulsation). This inertial value range strikes a balance between the dampening ability of the mass damper 148 and packaging constraints within the muffler 900. That is, the mass damper 148 must be configured so that is does not interfere with (i.e. contact) the of the outer shell 904, outlet header 908, or partition 910 of the muffler 900 as the valve flap 70 moves between the open and closed positions.

As shown in FIG. 2, the external shaft segment 108 of the shaft 102 is received in the attachment hole 152 of the mass damper 148 when the snap-action valve assembly 20 is fully assembled. Accordingly, the pivot axis 114 extends coaxially through the attachment hole 152 in the mass damper 148. Moreover, the primary mass damper axis 158 of the linear segment 154 of the mass damper 148 is transverse to the pivot axis 114. In the configuration shown in FIGS. 1, 2, and 13A, the first and second transverse segments 156a, 156b are transverse to both the primary mass damper axis 158 and the pivot axis 114. More particularly, the first and second transverse segments 156 of the mass damper 148 extend from the pair of damper ends 160 in opposite transverse directions relative to the primary mass damper axis 158. The pair of damper ends 160 and the first and second transverse segments 156a, 156b of the mass damper 148 are evenly spaced from the pivot axis 114 and thus the attachment hole 152 in the mass damper 148, which balances/distributes the mass of the mass damper 148 evenly about the pivot axis 114.

Figure 13B:
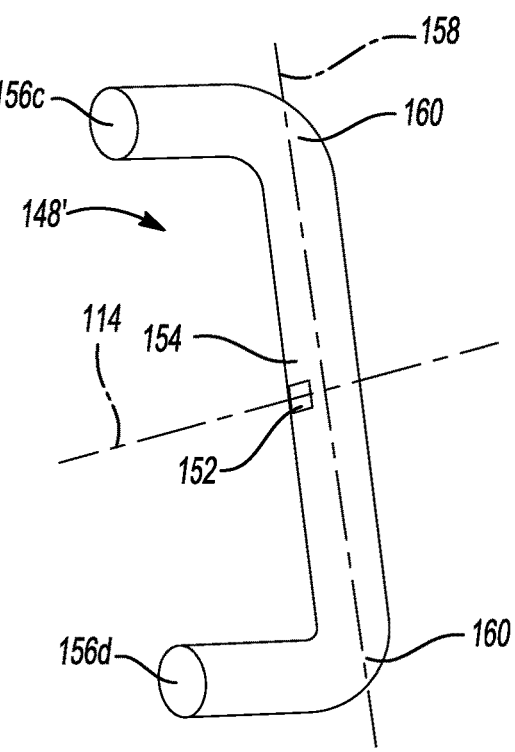
FIG. 13B is a side perspective view of another exemplary mass damper constructed in accordance with the subject disclosure, which has a U-like shape.

In the alternative configuration shown in FIG. 13B, a modified mass damper 148' is shown with first and second transverse segments 156c, 156d that are spaced apart and that extend from the pair of damper ends 160 in the same direction relative to the primary mass damper axis 158 giving the mass damper 148' a U-like shape. In accordance with this configuration, the first and second transverse segments 156c, 156d are still transverse to the primary mass damper axis 158 of the linear segment 154 of the mass damper 148', but the first and second transverse segments 156c, 156d now extend parallel to the pivot axis 114. The pair of damper ends 160 and the first and second transverse segments 156c, 156d of the mass damper 148' are evenly spaced from the pivot axis 114 and thus the attachment hole 152 in the mass damper 148', which balances/distributes the mass of the mass damper 148' evenly about the pivot axis 114.

Figure 13C:
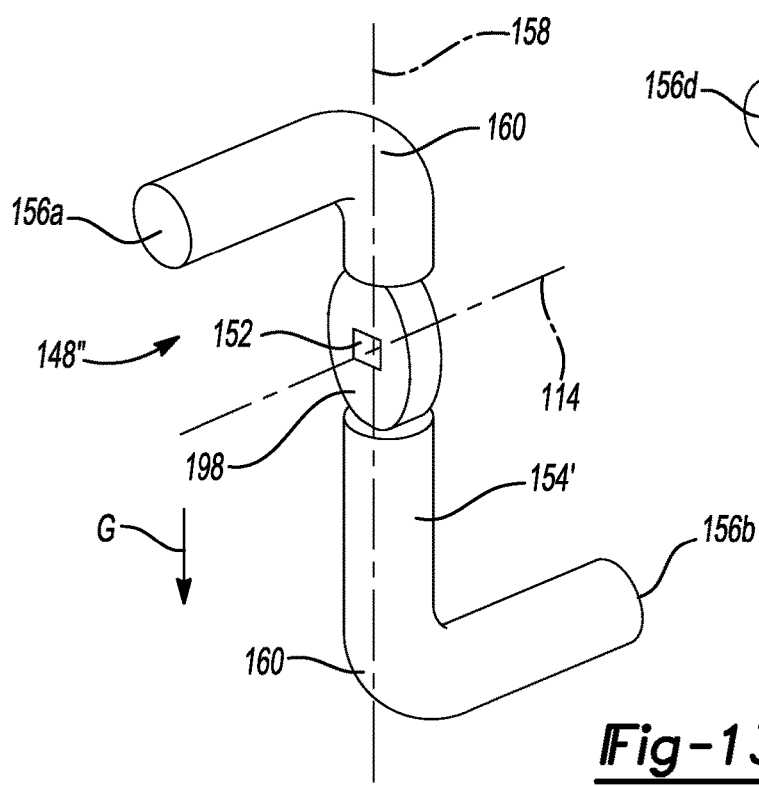
FIG. 13C is a side perspective view of another exemplary mass damper constructed in accordance with the subject disclosure, which has an imbalanced linear segment.

In the alternative configuration shown in FIG. 13C, a modified mass damper 148" is shown with an imbalanced linear segment 154'. Like in the configuration shown in FIGS. 1, 2, and 13A, the first and second transverse segments 156a, 156b of the mass damper 148" shown in FIG. 13C extend from the pair of damper ends 160 in opposite transverse directions relative to the primary mass damper axis 158 such that the first and second transverse segments 156a, 156b are transverse to both the primary mass damper axis 158 and the pivot axis 114. The attachment hole 152 in the imbalanced linear segment 154' is off-center such that the pair of damper ends 160 and the first and second transverse segments 156a, 156b of the mass damper 148" are unevenly spaced from the pivot axis 114 and the attachment hole 152. As a result, the mass of the mass damper 148" is imbalanced (i.e. is unevenly distributed) about the pivot axis 114. In accordance with this configuration, the imbalanced linear segment 154' may include a flattened portion 198 adjacent the attachment hole 152. The flattened portion 198 of the imbalanced linear segment 154' has a reduced cross-sectional width compared to the rest of the imbalanced linear segment 154', including the portions of the imbalanced linear segment 154' adjacent the pair of damper ends 160. The reduced cross-sectional width of the flattened portion 198 allows the mass damper 148" to be mounted closer to the valve flap 70 to allow for additional packaging clearance. Although the configuration shown in FIG. 13C is imbalanced, packaging constraints may necessitate the use of such a design. In order to minimize uneven torque loads created by the mass damper 148" on the shaft 102, the mass damper 148" may be mounted on the shaft 102 such that the primary mass damper axis 158 is vertically oriented (i.e. aligned with the direction of gravitational pull G) when the valve flap 70 is positioned half way between the open and closed positions. For example and without limitation, if the valve flap 70 travels 40 degrees between the open and closed positions, then the primary mass damper axis 158, which extends coaxially through the imbalanced linear segment 154', will be vertically oriented when the valve flap 70 is rotated 20 degrees from the closed position. Advantageously, the inventors have found that such a configuration utilizes gravity to minimize the uneven torque loads created by the mass damper 148" on the shaft 102.

Figure 13D:
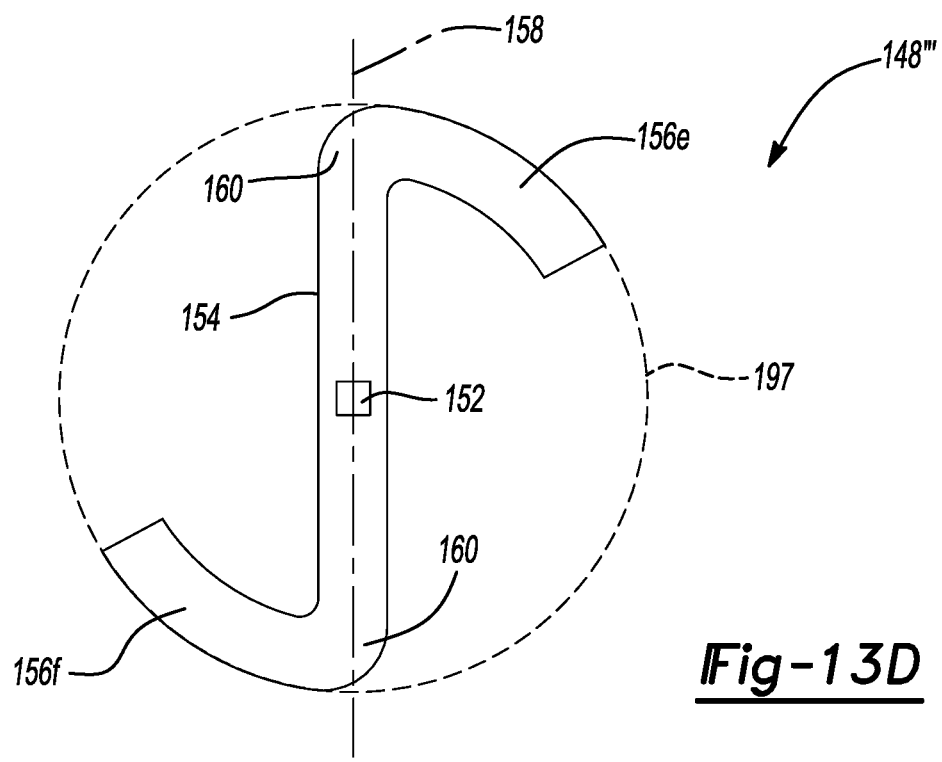
FIG. 13D is a side elevation view of another exemplary mass damper constructed in accordance with the subject disclosure, which has a S-like shape.

In the alternative configuration shown in FIG. 13D, a modified mass damper 148''' is shown with first and second transverse segments 156e, 156f that are spaced apart and extend from the pair of damper ends 160 in opposite directions relative to the primary mass damper axis 158. The first and second transverse segments 156e, 156f are curved giving the mass damper 148''' a S-like shape. In accordance with this configuration, the first and second transverse segments 156e, 156f are transverse to the primary mass damper axis 158 of the linear segment 154 of the mass damper 148''' and scribe a packaging circumference 197 about the attachment hole 152 in the mass damper 148''' when the mass damper 148''' is rotated 360 degrees about the attachment hole 152. As a result, the mass damper 148''' illustrated in FIG. 13D is particularly well suited for applications where packaging is tight and little space is available for the mass damper 148'''.

Figure 13E:
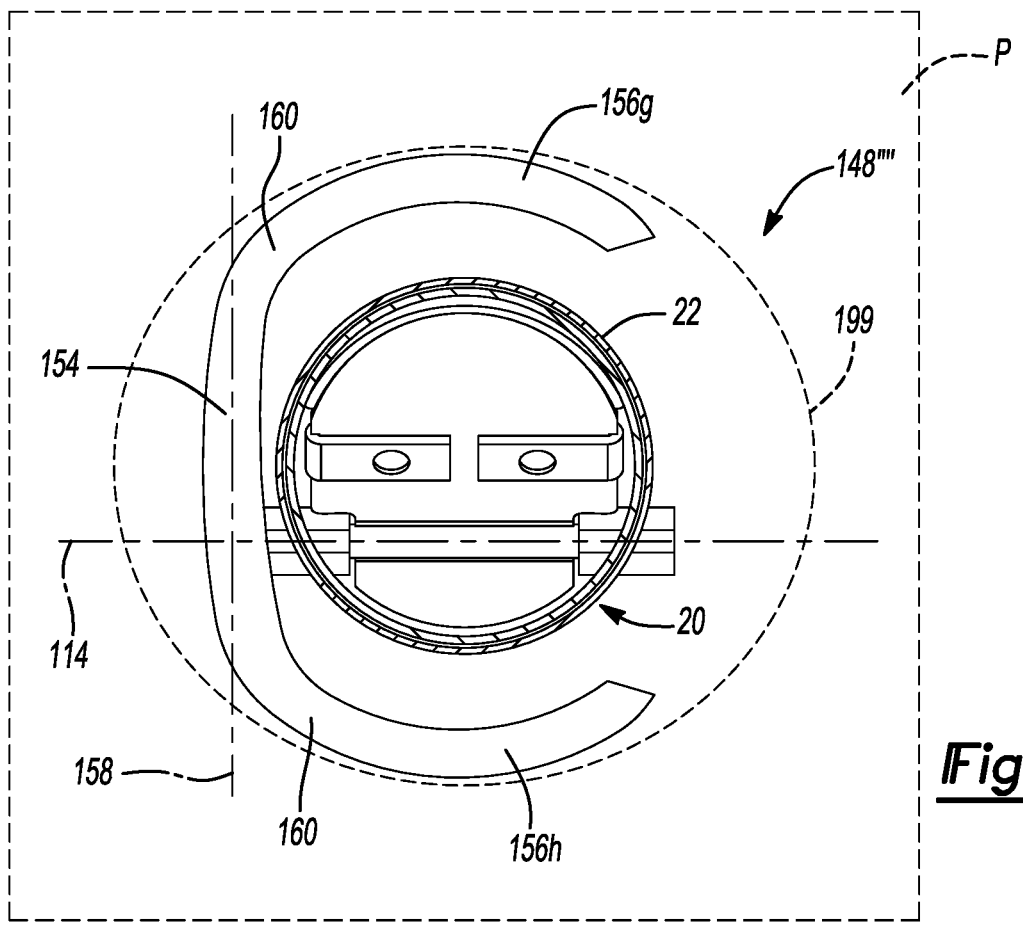
FIG. 13E is a front elevation view of another exemplary mass damper constructed in accordance with the subject disclosure, which has a C-like shape.

In the alternative configuration shown in FIG. 13E, a modified mass damper 148'''' is shown with first and second transverse segments 156g, 156h that are spaced apart and that extend from the pair of damper ends 160 in the same direction relative to the primary mass damper axis 158. The first and second transverse segments 156g, 156h are curved in a common plane P around at least part of the first conduit 22 of the snap-action valve assembly 20 giving the mass damper 148'''' a C-like shape. The pivot axis 114 is also disposed within the common plane P. In accordance with this configuration, the first and second transverse segments 156g, 156h are transverse to the primary mass damper axis 158 of the linear segment 154 of the mass damper 148'''' and are contained within a packaging boundary 199 that extends within common plane P. As a result, the mass damper 148'''' illustrated in FIG. 13E is well suited for applications where packaging is tight and little space is available for the mass damper 148''''.

Many modifications and variations of the present invention are possible in light of the above teachings and may be practiced otherwise than as specifically described while within the scope of the appended claims. These antecedent recitations should be interpreted to cover any combination in which the inventive novelty exercises its utility. With respect to the methods set forth herein, the order of the steps may depart from the order in which they appear without departing from the scope of the present disclosure and the appended method claims. Additionally, various steps of the method may be performed sequentially or simultaneously in time.

What is claimed is:

1. A snap-action valve assembly for an exhaust system comprising:

a first conduit extending along a central axis from a junction end to a distal end, said first conduit having a first conduit wall with an outside surface and an inner mating surface;

a second conduit extending co-axially with said central axis between an insertion end and a proximal end, said second conduit having a second conduit wall with an inner surface and an outer mating surface;

said first and second conduits cooperating to define an exhaust passageway therein that extends from said proximal end of said second conduit to said distal end of said first conduit;

a valve flap disposed within said first conduit for controlling exhaust flow through said exhaust passageway;

a shaft supporting said valve flap in said first conduit for rotation about a pivot axis between a closed position and an open position;

first and second bushings supporting said shaft on said first conduit, each of said first and second bushings including a shaft opening that receives said shaft;

said insertion end of said second conduit being received in said junction end of said first conduit such that said outer mating surface of said second conduit faces said inner mating surface of said first conduit;

said first conduit including first and second slots, each of said first and second slots extending through said first conduit wall from an open slot end positioned at said junction end of said first conduit to a closed slot end that is longitudinally spaced from said junction end of said first conduit a distance greater than said first bushing extends in a direction parallel to said central axis; and said first and second bushings being disposed within said first and second slots respectively between said insertion end of said second conduit and said closed slot ends of said first and second slots.

2. The snap-action valve assembly of claim 1, wherein each of said first and second slots include opposing linear edges that run parallel to one another and wherein said first and second slots extend parallel to one another in a slot plane.

3. The snap-action valve assembly of claim 2, wherein said slot plane is parallel to and spaced from said central axis of said first conduit by an offset distance and wherein said pivot axis of said valve flap extends in said slot plane.

4. A snap-action valve assembly for an exhaust system comprising:
a first conduit extending along a central axis from a junction end to a distal end, said first conduit having a first conduit wall with an outside surface and an inner mating surface;
a second conduit extending co-axially with said central axis between an insertion end and a proximal end, said second conduit having a second conduit wall with an inner surface and an outer mating surface;
said first and second conduits cooperating to define an exhaust passageway therein that extends from said proximal end of said second conduit to said distal end of said first conduit;
a valve flap disposed within said first conduit for controlling exhaust flow through said exhaust passageway;
a shaft supporting said valve flap in said first conduit for rotation about a pivot axis between a closed position and an open position;
first and second bushings supporting said shaft on said first conduit, each of said first and second bushings including a shaft opening that receives said shaft;
said insertion end of said second conduit being received in said junction end of said first conduit such that said outer mating surface of said second conduit faces said inner mating surface of said first conduit;
said first conduit including first and second slots, each of said first and second slots extending through said first conduit wall from an open slot end positioned at said junction end of said first conduit to a closed slot end that is longitudinally spaced from said junction end of said first conduit;
said first and second bushings being disposed within said first and second slots respectively between said insertion end of said second conduit and said closed slot ends of said first and second slots; and
first and second bushing sleeves supporting said first and second bushings within said first and second slots respectively, wherein each of said first and second bushing sleeves includes a bushing cavity that receives and supports one of said first and second bushings, and wherein each of said first and second bushing sleeves is received in one of said first and second slots and is disposed between said insertion end of said second conduit and one of said closed slot ends.

5. The snap-action valve assembly of claim 4, wherein each of said first and second bushing sleeves includes at least one flat portion that contacts one of said first and second slots to prevent rotation of said first and second bushing sleeves within said first and second slots.

6. The snap-action valve assembly of claim 5, wherein each of said first and second bushings includes at least one flat that contacts said at least one flat portion of one of said first and second bushing sleeves to prevent rotation of said first and second bushings within said first and second bushing sleeves.

7. The snap-action valve assembly of claim 4, wherein each of said first and second bushing sleeves includes at least one protrusion that extends therethrough into said bushing cavity, wherein each of said first and second bushings includes at least one dimple that is aligned with one of said protrusions of said first and second bushing sleeves, and wherein said protrusions of said first and second bushing sleeves extend into said dimples in said first and second bushings to prevent axial movement of said first and second bushings relative to said first and second bushing sleeves.

8. The snap-action valve assembly of claim 4, wherein said first and second bushings are made of wire mesh.

9. A snap-action valve assembly for an exhaust system comprising:
a first conduit extending along a central axis from a junction end to a distal end, said first conduit having a first conduit wall with an outside surface and an inner mating surface;
a second conduit extending co-axially with said central axis between an insertion end and a proximal end, said second conduit having a second conduit wall with an inner surface and an outer mating surface;
said first and second conduits cooperating to define an exhaust passageway therein that extends from said proximal end of said second conduit to said distal end of said first conduit;
a valve flap disposed within said first conduit for controlling exhaust flow through said exhaust passageway;
a shaft supporting said valve flap in said first conduit for rotation about a pivot axis between a closed position and an open position;
first and second bushings supporting said shaft on said first conduit, each of said first and second bushings including a shaft opening that receives said shaft;
said insertion end of said second conduit being received in said junction end of said first conduit such that said outer mating surface of said second conduit faces said inner mating surface of said first conduit;
said first conduit including first and second slots, each of said first and second slots extending through said first conduit wall from an open slot end positioned at said junction end of said first conduit to a closed slot end that is longitudinally spaced from said junction end of said first conduit;
said first and second bushings being disposed within said first and second slots respectively between said insertion end of said second conduit and said closed slot ends of said first and second slots; and
wherein said shaft includes an axle portion, a lever arm, and a spring attachment arm, wherein at least part of said axle portion is disposed within said first conduit and said lever arm and said spring attachment arm are external to said first conduit, wherein said valve flap is carried on said axle portion such that said axle portion of said shaft rotates with said valve flap, wherein said axle portion is co-axially aligned with said pivot axis of said valve flap and said spring attachment arm defines a spring attachment arm axis that is parallel to and spaced from said pivot axis, wherein said lever arm extends transversely between said axle portion and said spring attachment arm of said shaft, and wherein said first conduit includes an anchor post extending outwardly from said outside surface of said first conduit.

10. The snap-action valve assembly of claim 9 further comprising:
a tension spring having a helical main body disposed between first and second hook ends, said first hook end of said tension spring being retained on said spring attachment arm of said shaft and said second hook end of said tension spring being retained on said anchor post, said tension spring biasing said valve flap to said closed position.

11. The snap-action valve assembly of claim 10, wherein said anchor post is integral with and partially cut out from said first conduit wall, said first conduit wall including an anchor post cut-out, and said anchor post extending from a bent transition adjacent said first conduit wall.

12. A snap-action valve assembly for an exhaust system comprising:
a first conduit extending along a central axis from a junction end to a distal end, said first conduit having a first conduit wall with an outside surface and an inner mating surface;
a second conduit extending co-axially with said central axis between an insertion end and a proximal end, said second conduit having a second conduit wall with an inner surface and an outer mating surface;
said first and second conduits cooperating to define an exhaust passageway therein that extends from said proximal end of said second conduit to said distal end of said first conduit;
a valve flap disposed within said first conduit for controlling exhaust flow through said exhaust passageway;
a shaft supporting said valve flap in said first conduit for rotation about a pivot axis between a closed position and an open position;
first and second bushings supporting said shaft on said first conduit, each of said first and second bushings including a shaft opening that receives said shaft;
said insertion end of said second conduit being received in said junction end of said first conduit such that said outer mating surface of said second conduit faces said inner mating surface of said first conduit;
said first conduit including first and second slots, each of said first and second slots extending through said first conduit wall from an open slot end positioned at said junction end of said first conduit to a closed slot end that is longitudinally spaced from said junction end of said first conduit;
said first and second bushings being disposed within said first and second slots respectively between said insertion end of said second conduit and said closed slot ends of said first and second slots; and
a mass damper external to said first and second conduits that is rotatably coupled to said shaft such that said mass damper rotates with said shaft, said mass damper including a linear segment extending along a primary mass damper axis between a pair of damper ends, a first transverse segment, and a second transverse segment, said first and second transverse segments extending from said pair of damper ends in opposite transverse directions relative to said primary mass damper axis.

13. A snap-action valve assembly for an exhaust system comprising:

a first conduit extending along a central axis from a junction end to a distal end, said first conduit having a first conduit wall with an outside surface and an inner mating surface;
a second conduit extending co-axially with said central axis between an insertion end and a proximal end, said second conduit having a second conduit wall with an inner surface and an outer mating surface;
said first and second conduits cooperating to define an exhaust passageway therein that extends from said proximal end of said second conduit to said distal end of said first conduit;
a valve flap disposed within said first conduit for controlling exhaust flow through said exhaust passageway;
a shaft supporting said valve flap in said first conduit for rotation about a pivot axis between a closed position and an open position;
first and second bushings supporting said shaft on said first conduit, each of said first and second bushings including a shaft opening that receives said shaft;
said insertion end of said second conduit being received in said junction end of said first conduit such that said outer mating surface of said second conduit faces said inner mating surface of said first conduit;
said first conduit including first and second slots, each of said first and second slots extending through said first conduit wall from an open slot end positioned at said junction end of said first conduit to a closed slot end that is longitudinally spaced from said junction end of said first conduit;
said first and second bushings being disposed within said first and second slots respectively between said insertion end of said second conduit and said closed slot ends of said first and second slots; and
wherein said first conduit has a tubular shape and includes a first enlarged conduit segment at said junction end and a neck portion disposed longitudinally between said first enlarged conduit segment and said distal end, wherein said neck portion of said first conduit has a first inner diameter and said first enlarged conduit segment of said first conduit has a second inner diameter that is larger than said first inner diameter of said neck portion, wherein said second conduit has a tubular shape and an outer diameter measured across said outer mating surface that is smaller than said second inner diameter of said first enlarged conduit segment of said first conduit, and wherein said insertion end of said second conduit is slidingly received within said first enlarged conduit segment of said first conduit.

14. A method of manufacturing a snap-action valve assembly for an exhaust system, the method comprising the step of:
providing a first conduit with a junction end;
providing a second conduit with an insertion end;
cutting first and second slots into the junction end of the first conduit, each of the first and second slots extending longitudinally along the first conduit from an open slot end positioned at the junction end of the first conduit to a closed slot end;
placing first and second bushing sleeves over first and second bushings to form first and second bushing subassemblies;
placing the first bushing subassembly on a shaft by sliding the shaft through the first bushing;
attaching a valve flap to the shaft;
placing the second bushing subassembly on the shaft by sliding the shaft through the second bushing to form a valve flap subassembly where the valve flap is positioned on the shaft between the first and second bushing subassemblies;

sliding the valve flap subassembly into the first conduit from the junction end such that the shaft and the first and second bushing subassemblies are slidingly received in the first and second slots until the first and second bushing sleeves abut the closed slot ends; and sliding the insertion end of the second conduit into the junction end of the first conduit until the insertion end of the second conduit abuts the first and second bushing sleeves.

15. The method of claim 14, further comprising the steps of:

cutting an anchor post out from the first conduit;

bending the anchor post outwardly away from the first conduit; and connecting a tension spring between the anchor post and a spring attachment arm on the shaft to bias the valve flap to a closed position.

16. The method of claim 14, further comprising the step of:

attaching a mass damper to the shaft to dampen vibration related harmonics and reduce valve flap flutter.

\* \* \* \* \*